United States Patent [19]
Guertin

[11] Patent Number: 5,867,998
[45] Date of Patent: Feb. 9, 1999

[54] CONTROLLING REFRIGERATION

[75] Inventor: Lawrence J. Guertin, Stewartstown, Pa.

[73] Assignee: EIL Instruments Inc., Hunt Valley, Md.

[21] Appl. No.: 797,180

[22] Filed: Feb. 10, 1997

[51] Int. Cl.⁶ ................................................. F25B 41/00
[52] U.S. Cl. .................................. 62/225; 62/211; 62/223
[58] Field of Search .............................. 62/222, 223, 224, 62/225, 210, 211, 212, 204

[56] References Cited

U.S. PATENT DOCUMENTS

| | | | |
|---|---|---|---|
| 4,523,435 | 6/1985 | Lord | 62/225 X |
| 4,685,309 | 8/1987 | Behr | 62/223 X |
| 4,845,956 | 7/1989 | Berntsen et al. | 62/225 |

*Primary Examiner*—Harry B. Tanner
*Attorney, Agent, or Firm*—Fish & Richardson P.C.

[57] ABSTRACT

A controller operates an electronic expansion valve (EEV) to control flow of refrigerant in an evaporator coil of a refrigeration system. The controller measures a superheat of the coil over a natural fill and boil cycle of the coil to determine an average rate at which the flow of refrigerant into the coil produces a desired temperature difference across the coil. The controller then operates the valve in a manner to control the flow of refrigerant based on the average rate.

19 Claims, 29 Drawing Sheets

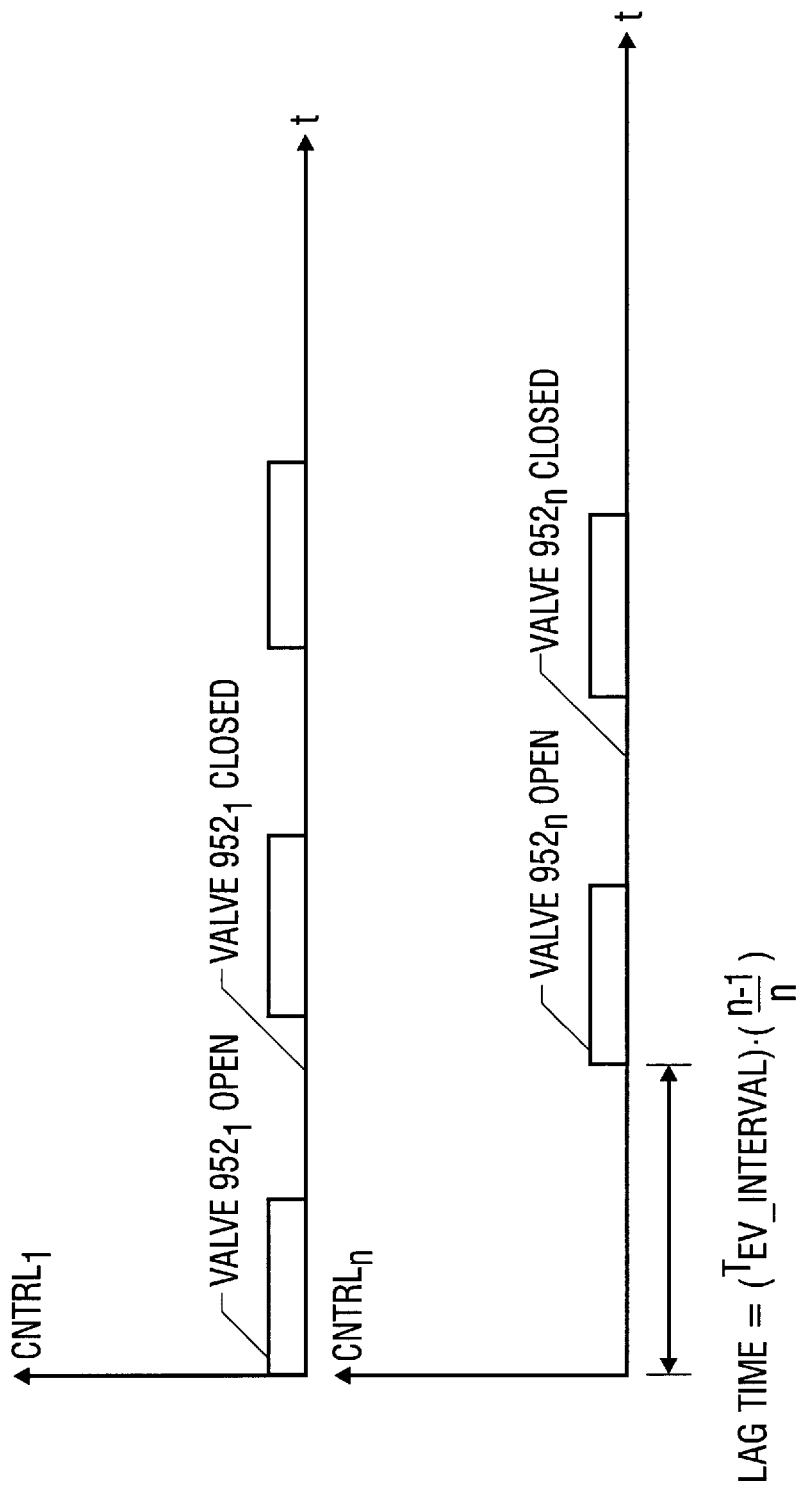

5,867,998

CONTROLLING REFRIGERATION

BACKGROUND OF THE INVENTION

The invention relates to controlling refrigeration.

A refrigeration system is used to cool an enclosed area, such as a food storage case, by absorbing heat from the enclosed area and releasing the heat outside the enclosed area. To accomplish this, a highly-pressurized liquid refrigerant (e.g., freon) is introduced into a low pressure environment provided by the interior of an evaporator coil (located within the enclosed area). Inside the evaporator coil, the refrigerant depressurizes, absorbs heat from the enclosed area, and boils, forming a vapor. This vapor is removed from the evaporator coil and compressed back into the liquid refrigerant inside a condenser coil (located outside of the enclosed area) where the refrigerant releases the absorbed heat.

An expansion valve typically controls the flow of liquid refrigerant into the evaporator coil. As a result of a high to low pressure transition across the evaporator coil and the increased volume presented by the evaporator coil to the refrigerant entering the coil, the liquid refrigerant changes (inside the coil) to a saturated vapor (a mixture of liquid and gas at the refrigerant boiling point). Since a liquid at its boiling point does not increase in temperature until a change to the vapor state has taken place, it is desirable to maintain a sufficient flow through the expansion valve such that the refrigerant remains a saturated vapor throughout the evaporator coil. However, to avoid damaging most compressors, the refrigerant needs to be completely in a vapor state when returning to the compressor system. Thus, a typical control unit attempts to operate the valve in a manner to ensure this state change by creating a refrigerant temperature rise (often referred to as a superheat of the coil) across the evaporator coil.

The control unit typically measures the superheat and regulates the valve based upon this measurement. For purposes of preventing undershoots in the superheat (and the related problem of returning liquid refrigerant to the compressor), a typical solution is to target a higher than desirable superheat.

SUMMARY OF THE INVENTION

The invention relates to a refrigeration system having an evaporator coil in which flow of refrigerant in the evaporator coil is controlled by a controller. The controller determines an average rate at which flow of refrigerant into the coil produces a desired temperature difference (i.e., a superheat) across the coil. The controller then controls the flow based on the average rate.

In preferred embodiments, the controller includes a controller which controls the flow via an expansion valve. For purposes of determining the average rate, the controller operates the valve to furnish refrigerant to the coil over a time interval in such a manner that a natural fill/boil cycle is measured. The controller monitors the flow of refrigerant over this time interval and determines the average rate during the time interval. Subsequently, the flow is controlled based upon this average rate and may include opening and closing the valve pursuant to a fixed duty cycle which is selected based on the average rate. The controller may also control the flow of refrigerant in multiple evaporator coils connected in parallel.

The advantages of the invention may include one or more of the following: the superheat of the evaporator coil is stabilized which minimizes the chance of returning liquid refrigerant to the compressor system. A stabilized superheat enables the evaporator to be operated with a smaller (and thus, optimum) superheat. With an optimum superheat, the efficiency of the evaporator coil is maximized; the temperature at the evaporator coil inlet is stabilized; and a consistently cold discharge air temperature is furnished by the evaporator coil.

Other advantages and features will become apparent from the description and from the claims.

BRIEF DESCRIPTION OF THE DRAWING

FIG. 10 shows waveforms from the refrigeration system of FIG. 9.

DESCRIPTION OF THE PREFERRED EMBODIMENTS

Figure 1:
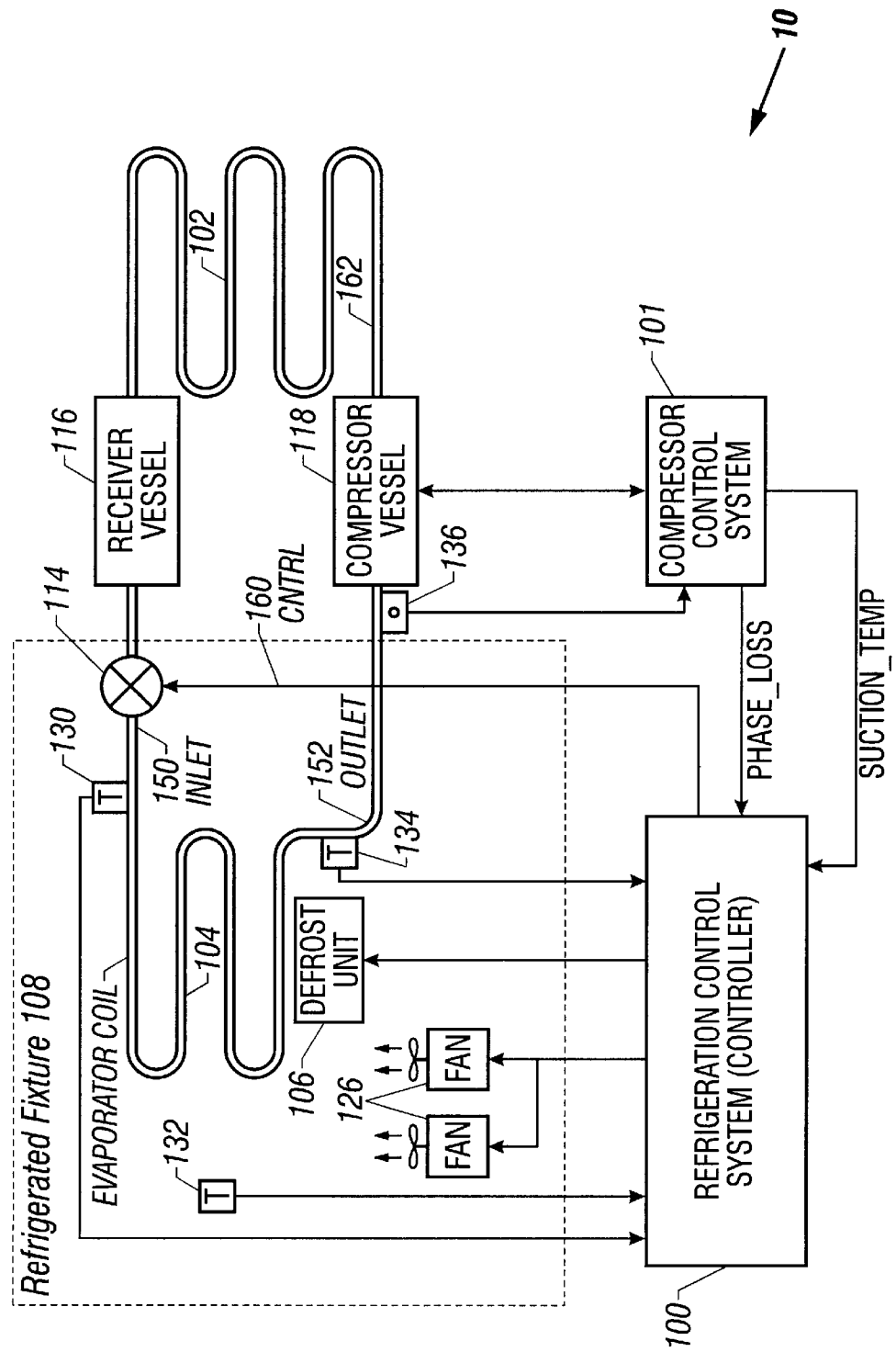
FIG. 1 is a block diagram of a refrigeration system according to one embodiment of the invention.

As shown in FIG. 1, an optimum superheat for a refrigeration system 10 is a minimum temperature difference between an outlet 152 and an inlet 150 of an evaporator coil 104 that ensures a liquid refrigerant remains in a vapor state inside the evaporator coil 104. To stabilize this optimum superheat, a controller 100 (e.g., a microcontroller or microprocessor) uses an averaging technique to control a rate at which the refrigerant flows into the evaporator coil 104. The controller 100 regulates the rate by selectively opening and closing an electrically operated expansion valve 114 which controls access to the inlet 150 of the coil 104.

With a stabilized optimum superheat, air (provided by fans 126) flowing across the evaporator coil 104 furnishes a consistently cold air temperature for a fixture 108 to be cooled. Furthermore, with a stabilized optimum superheat, the refrigeration system 10 may operate with a desirable, high suction pressure and still ensure a sufficiently cold air temperature. With a high suction pressure, the required load of a compressor system 118 (used to compress the refrigerant returning from the outlet 152 of the evaporator coil 104) is minimized, and the efficiency of the refrigeration system 10 is maximized.

Figure 2:
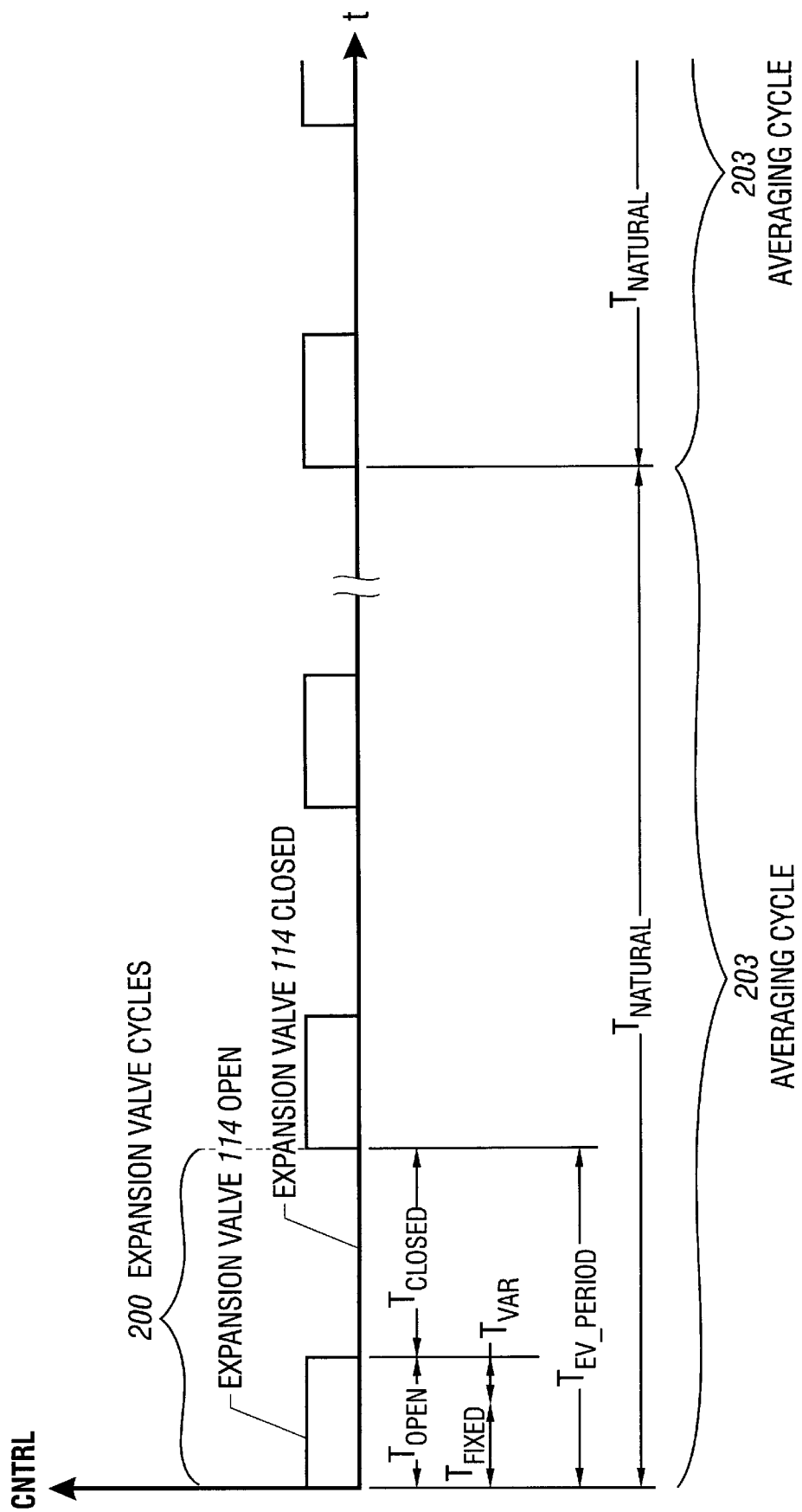
FIG. 2 is a waveform from the refrigeration system of FIG. 1.

As shown in FIG. 2, the controller 100 regulates the rate at which refrigerant enters the coil 104 by opening and closing the expansion valve 114 via successive expansion valve cycles 200. Each expansion valve cycle 200 has the same, predetermined period $T_{EV\_PERIOD}$ (e.g., a period recommended by the manufacturer of the expansion valve 114) which includes an open time interval $T_{OPEN}$ and a closed time interval $T_{CLOSED}$. The controller 100 controls the opening and closing of the valve 114 through a control signal CNTRL that is furnished by the controller 100. During the open time interval $T_{OPEN}$ of the expansion valve cycle 200, the signal CNTRL is asserted, the valve 114 is open, and liquid refrigerant flows into the inlet 150. Directly following the open time interval $T_{OPEN}$ in time is the closed time interval $T_{CLOSED}$. During the closed time interval $T_{CLOSED}$, the signal CNTRL is deasserted, the valve 114 is closed, and no liquid refrigerant flows into the inlet 150.

Figure 6:
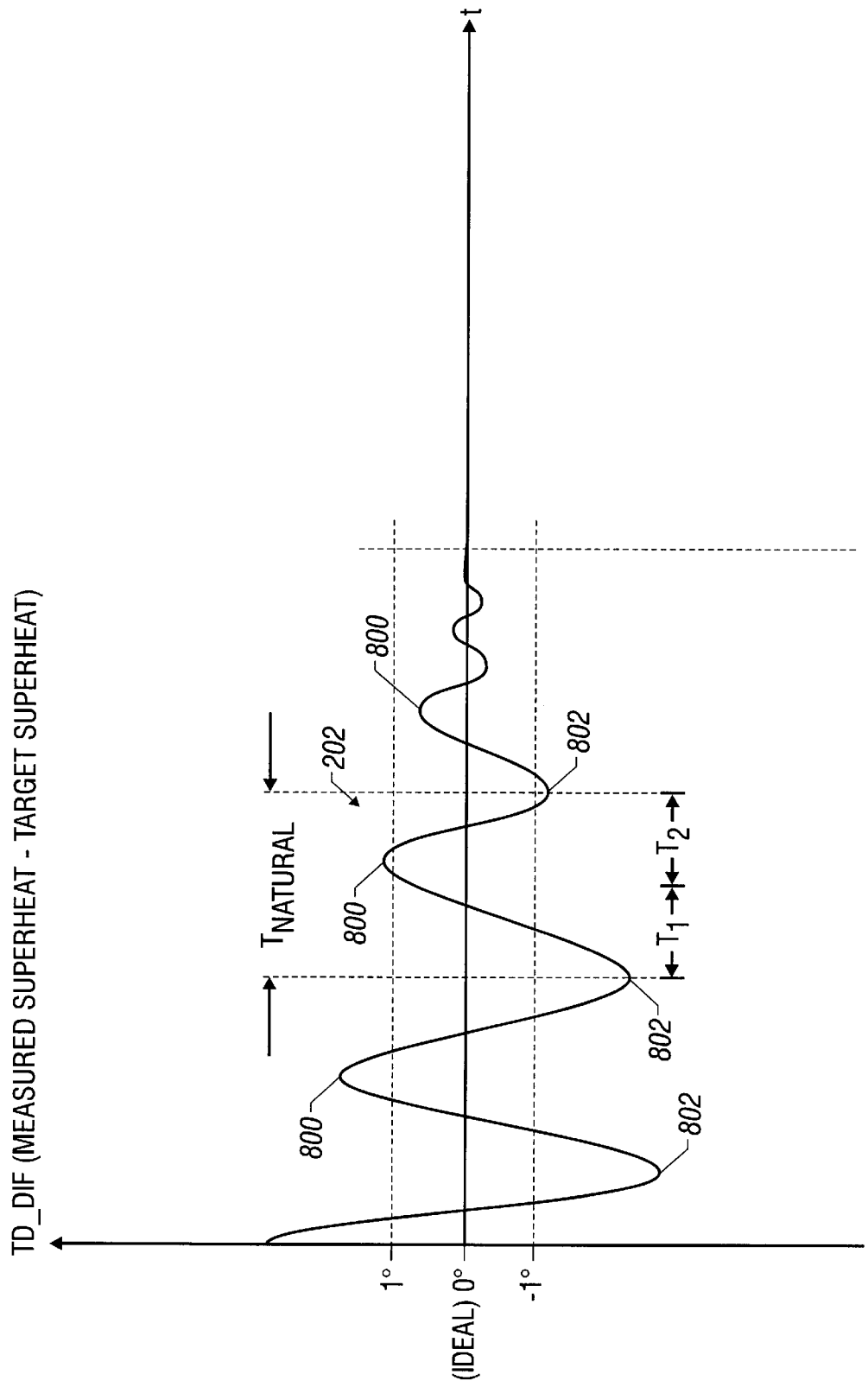
FIG. 6 is a waveform showing temperature characteristics of the evaporator coil of FIG. 1.
Figure 7A:
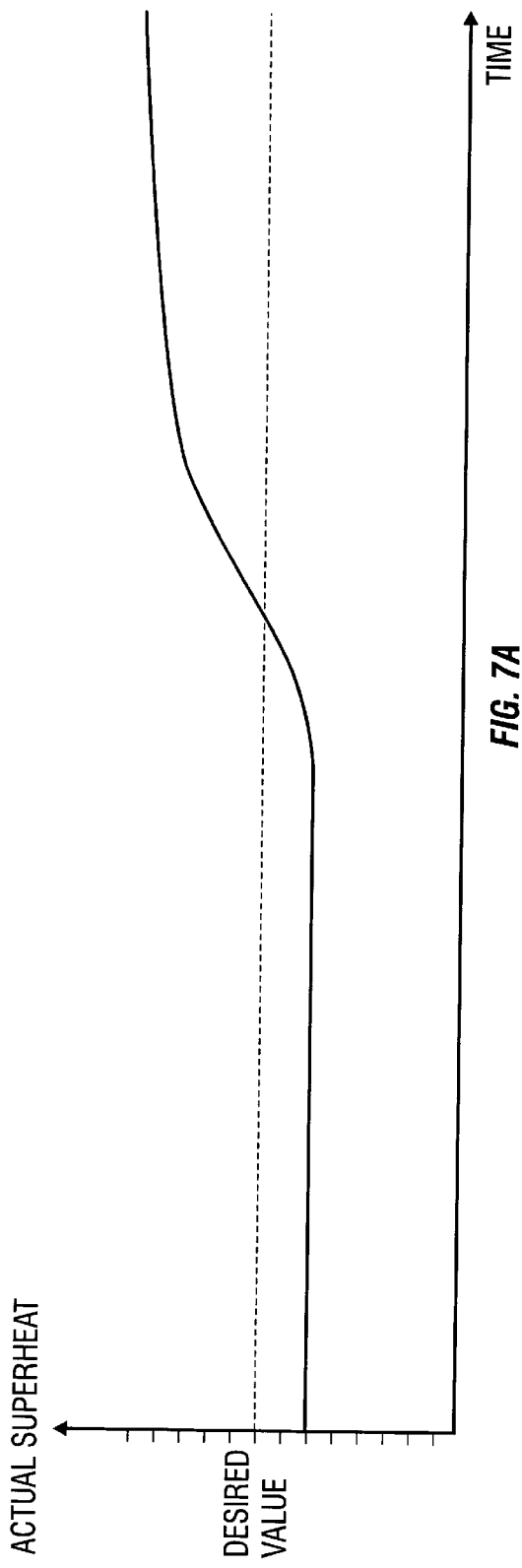
FIGS. 7A and 7B are waveforms showing the relationship between a change in an open time of an expansion valve cycle of an expansion valve and the resultant superheat of the evaporator coil.
Figure 7B:
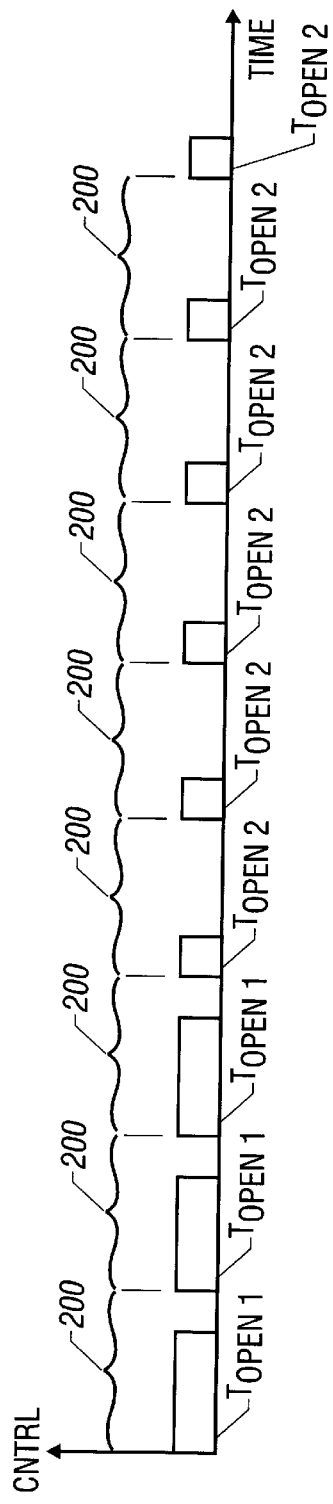

As shown in FIGS. 6, 7A and 7B, it has been determined that a change in the rate at which the refrigerant flows into the coil 104 does not produce a resulting change in the superheat until a time interval elapses. For an evaporator coil 104 that is substantially filled with refrigerant and has a measured superheat below a target setpoint, the coil undergoes a natural fill and boil cycle. The natural fill and boil cycle has a duration $T_{NATURAL}$ that has two intervals $T_1$ and $T_2$. The first interval $T_1$ (during which the expansion valve 114 has an open time $T_{OPEN1}$) is the time required for a reduction in the level of refrigerant furnished to the inlet 150 to cause the measured superheat to rise above the target setpoint (i.e., the superheat transitions from an undershoot 802 to an overshoot 800). The first time interval $T_1$ is successively followed by a second interval $T_2$ which is the time required for the superheat to fall back below the target setpoint when the level of refrigerant furnished to the inlet 150 is increased (i.e., the superheat transitions from an overshoot 800 to an undershoot 802). The control technique used by the controller 100 reduces the amplitude of the overshoots 800 and undershoots 802.

As shown in FIG. 2, for purposes of taking into account the natural time interval $T_{NATURAL}$, the controller 100 uses successive averaging cycles 203, of duration $T_{NATURAL}$, to adjust the duty ratio (open time interval $T_{OPEN}$ to closed time interval $T_{CLOSED}$) of the expansion valve cycle 200 based on an averaging technique. The averaging cycles 203 include multiple expansion valve cycles 200. For each averaging cycle 203, the controller 100 calculates the average rate (via successive open time intervals $T_{OPEN}$) at which refrigerant flows into the coil 104. In the next successive averaging cycle 203, the controller 100 regulates refrigerant flow (and thus the superheat) based on the average rate monitored during the previous averaging cycle 203. The controller 100 repeats the above-described process as the controller 100 uses successive approximations to control the superheat. This monitoring and adjustment of the average flow rate of the refrigerant by the controller 100 is continuously repeated as long as the refrigeration system 10 is furnishing additional refrigeration.

The time interval $T_{OPEN}$ includes a fixed open time interval $T_{FIXED}$ which is successively followed in time by a variable open time interval $T_{VAR}$. The fixed open time interval $T_{FIXED}$ represents a duration that is slightly less than the required open time that the controller 100 (based on the average rate of flow measured during the last averaging cycle 203) estimates is needed to maintain the desired predetermined level of superheat over the next averaging cycle 203.

Preferably, the controller 100 only adjusts the fixed open time interval $T_{FIXED}$ at the end of one averaging cycle 203 and the beginning of the next averaging cycle 203. However, the controller 100 may also adjust the fixed open time interval $T_{FIXED}$ while the averaging cycle 203 is taking place. The variable open time interval $T_{VAR}$ is an extension of the fixed open time interval $T_{FIXED}$ and is used by the controller 100 to dynamically adjust the open time of the valve 114 $T_{OPEN}$, as needed, to maintain the superheat at the predetermined level. The controller 100 may adjust the variable time interval $T_{VAR}$ between successive expansion valve cycles 200. As time elapses, the duration of the fixed open time interval $T_{FIXED}$ becomes closer to the duration of the open time interval $T_{OPEN}$.

Figure 8:
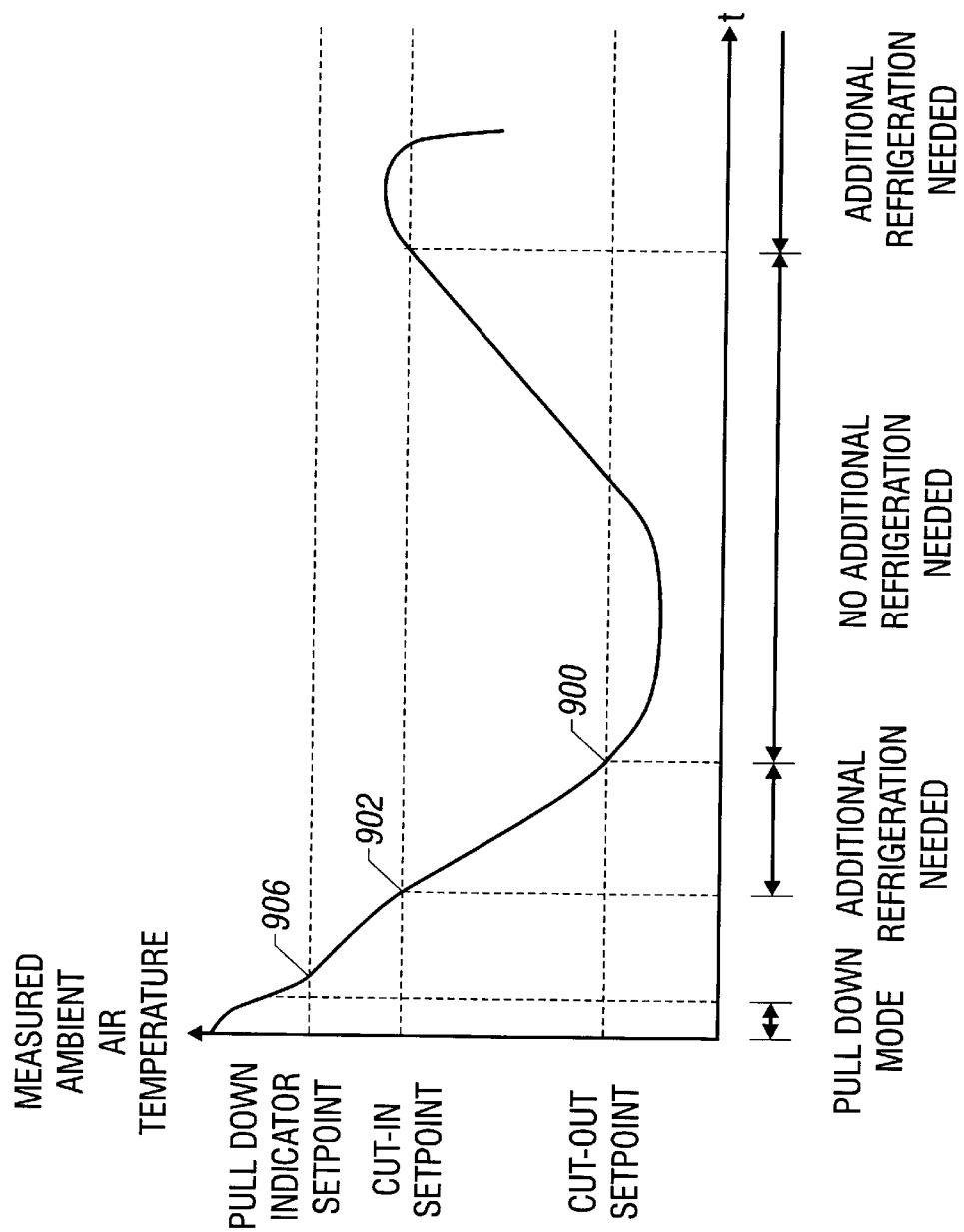
FIG. 8 is a waveform of the ambient air temperature of the refrigeration system of FIG. 1.

As shown in FIG. 8, for purposes of determining the natural interval $T_{NATURAL}$, the natural fill and boil cycle 202 is measured by the controller 100 starting at "pull down" of the refrigeration system 10. "Pull down" occurs when the refrigeration system 10 provides maximum refrigeration to the refrigerated fixture 108, such as after defrost or when the refrigeration system 10 is first turned on. At the start of pull down, the ambient air temperature surrounding the coil 104 exceeds a high, predetermined pull down indicator set point 906.

As shown in FIG. 1, to carry out the above-described operations, the controller 100 receives coil 104 inlet temperature information from a temperature sensor 130 (FIG. 1), the temperature equivalent of the suction pressure (represented by a signal called SUCTION_TEMP) from compressor control system 101, and coil 104 outlet temperature information from a temperature sensor 134 near the outlet 152. The controller 100 analyzes this temperature information and controls the expansion valve 114 through the signal CNTRL.

The refrigerant of the evaporator coil 104 absorbs heat and flows through the outlet 152 to a suction line 160. The compressor system 118 withdraws the refrigerant from the evaporator coil 104 and discharges the refrigerant (still in its vapor state) into a discharge line 162 which is connected to a condenser coil 102. The compressor system 118 can either be a single compressor or multiple parallel piped compressors. The refrigerant flows through the condenser coil 102 to a receiver vessel 116. The refrigerant releases heat inside the condenser coil 102 (where it undergoes a state change from a gas back into a liquid), and the receiver vessel 116 supplies the refrigerant to the inlet 150 (via the expansion valve 114).

The compressor control system 101 receives pressure information form a pressure sensor 136 located at suction inlet 160 of the compressor system 118. The system 101 then generates and furnishes the signal SUCTION_TEMP which represents the temperature equivalent of the suction pressure (derived from a temperature-pressure lookup table). The compressor control system 101 also furnishes a phase loss signal called PHASE_LOSS which is indicative of the status of the three phase power to refrigeration system 10.

The controller 100 also receives the output of the sensor 130, the output of the temperature sensor 134, the output of the temperature sensor 134, and the ambient air temperature information from a temperature sensor 132 located within the refrigerated fixture 108. In response to these inputs, the controller 100 generates an internal signal which represents the minimum of either SUCTION_TEMP or the inlet 150 temperature, or an internal sensor fault value, if a fault has occurred. The controller 100 also controls defrost unit 106 and fans 126. These fans 126 generate an airflow across the evaporator coil 104 to transfer heat removed from the refrigerated fixture 108 back to the refrigerant within evaporator 104.

Figure 3A:
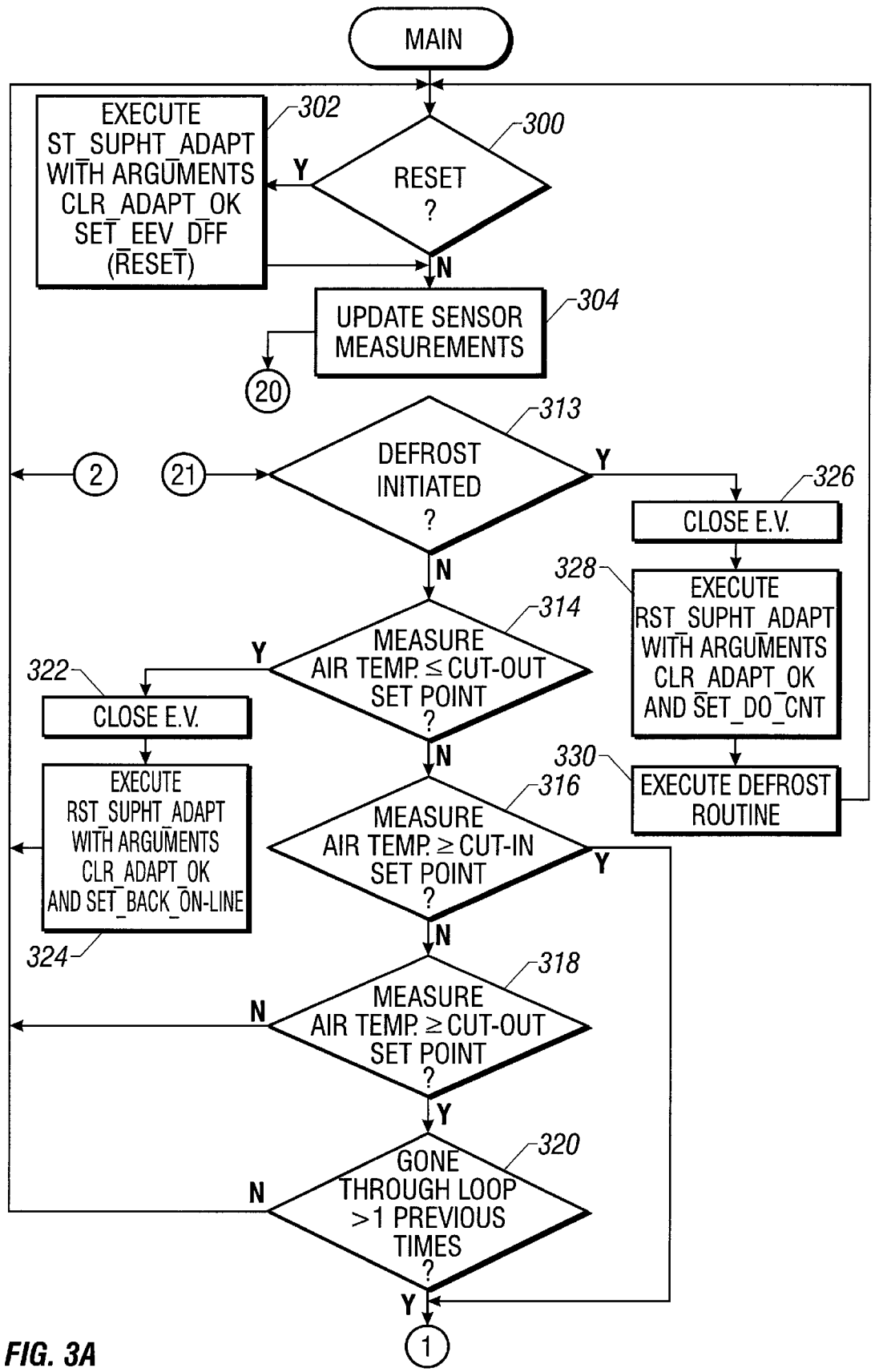
FIGS. 3A, 3B, 4A–M, and 5A–G are flowchart diagrams illustrating an algorithm to control the expansion valve of the refrigeration system of FIG. 1.
Figure 3B:
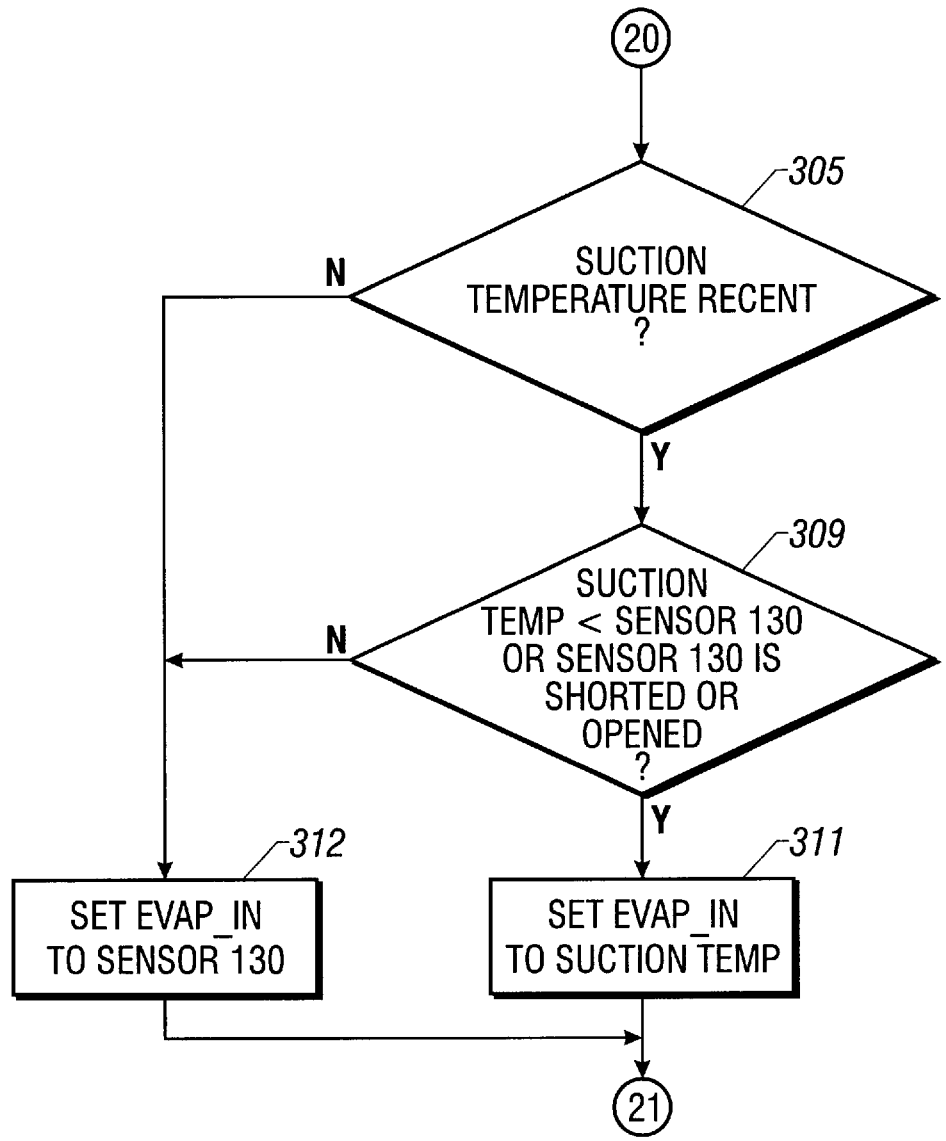

As shown in FIGS. 3A and 3B, in the typical course of operation, the controller 100, in response to a reset 300, executes 302 a routine called RST_SUPHT_ADAPT with arguments called CLR_ADAPT_OK (to indicate that certain adaption parameters for the averaging cycle 203 should be cleared) and SET_EEV_DEF (to indicate that certain adaption parameters should be set equal to default values) to initialize parameters associated with superheat control and adaption. Because there is not a previous averaging cycle 203 at this point, the average open time of the expansion valve 114 and the fixed time interval $T_{FIXED}$ are set equal to predetermined values. The controller 100 then updates 304 sensor measurements of the refrigeration system 10 by reading and storing the information provided by the sensors 128–136.

The controller 100 then determines 305–312 the effective inlet temperature (called EVAP_IN) of the coil 104. If the controller 100 determines 305 the parameter SUCTION_TEMP has been calculated recently and the temperature indicated by SUCTION_TEMP is less than the temperature indicated by the sensor 130, or sensor 130 is shorted or opened, the controller 100 sets 311 the effective inlet temperature to the value indicated by the SUCTION_TEMP. Otherwise, the controller 100 sets 312 the effective inlet temperature equal to temperature indicated by sensor 130.

The controller 100 then determines 313–320 whether additional refrigeration is desired, i.e., whether the expansion valve cycles 200 should proceed or whether the expansion valve 114 should be closed until further refrigeration is desired. Additional refrigeration is not required if the controller 100 determines 306 a defrost cycle has been initiated.

If the defrost cycle has been initiated, the controller 100 closes 326 the expansion valve 114, and executes 328 the RST_SUPHT_ADAPT routine with arguments CLR_ADAPT_OK and SET_PD_CNT (flags used to indicate "pull down" of the refrigeration systems, as described below). The RST_SUPHT_ADAPT routine clears the ADAPT_UP and ADAPT_DN to indicate whether a parameter called FIXED_DUTY (indicative of the fixed time interval $T_{FIXED}$) has been recently compensated up (ADAPT_UP) or down (ADAPT_DN) to stabilize the superheat. The controller 100 then executes 330 a defrost routine to defrost the evaporator coil 104 and repeats the above-described process beginning with step 300.

If the controller 100 determines 313 that defrosting of the refrigeration system 10 is not required, then the controller 100 determines 314–320 whether the measured ambient air temperature (provided by the sensor 132) indicates more refrigeration is needed. If the controller 100 determines 314 the measured air temperature is less than or equal to a cut-out set point 900 (FIG. 8), then no additional refrigeration is needed. If the controller 100 determines 316 the measured air temperature is greater than or equal to the cut-in set point 902, then additional refrigeration is needed.

If the controller 100 determines 316 the measured air temperature is less than the cut-in set point 902 but greater than the cut-out setpoint 900 and additional refrigeration is already being provided, then the controller 100 uses the hysteresis built into the set points 900 and 902 to permit additional refrigeration. If no additional refrigeration is required, the controller 100 executes the RST_SUPHT_ADAPT routine with arguments CLR_ADAPT_OK and SET_BACK_ONLINE (a flag used to indicate the refrigeration systems 10 needs to come back on-line) and repeats the above-described process beginning with step 300.

If the controller 100 determines 314–320 that additional refrigeration is needed, then the controller 100 controls the expansion valve 114 in a manner to stabilize the flow of the refrigerant into the evaporator coil 104, as described below.

Figure 4A:
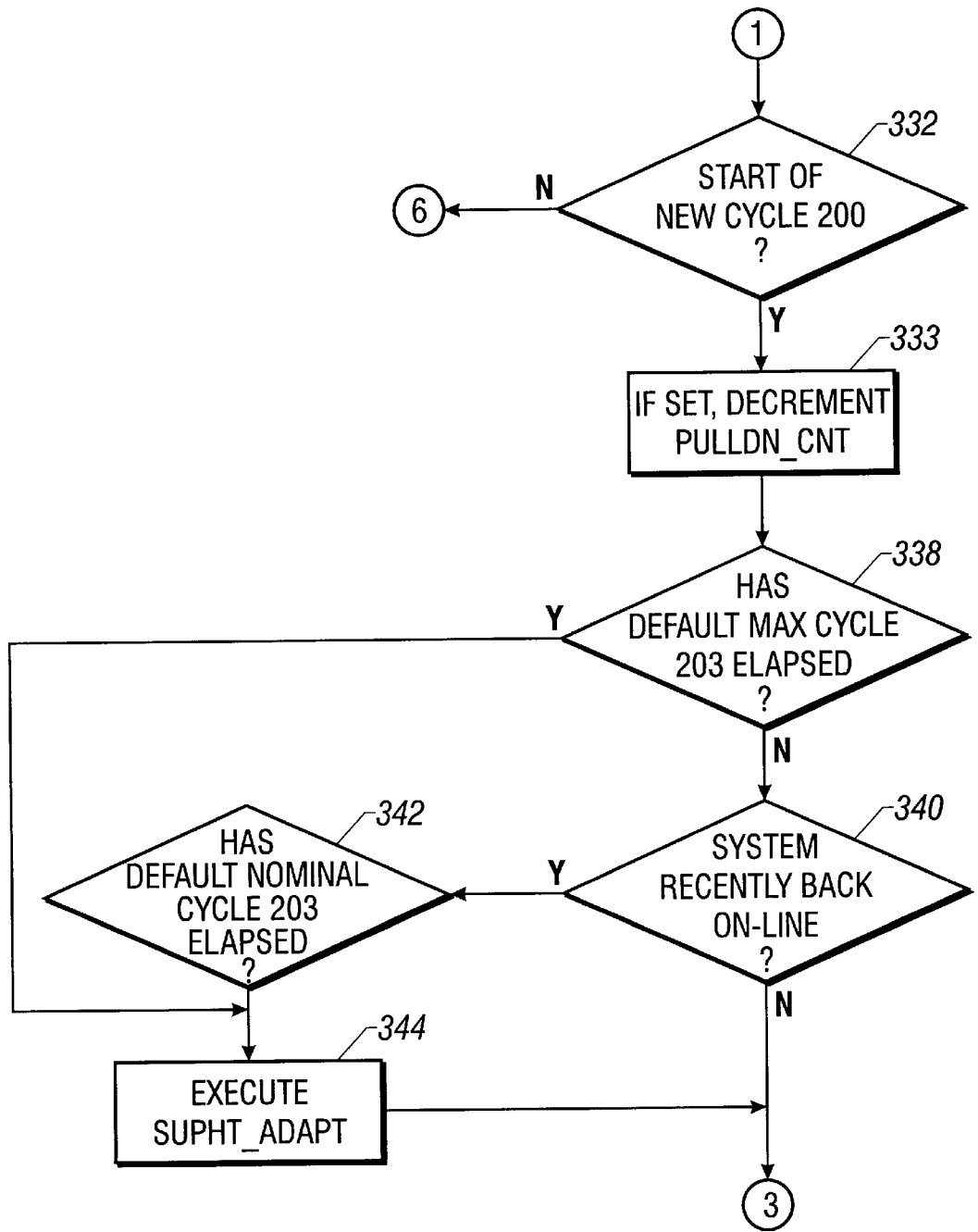
Figure 4B:
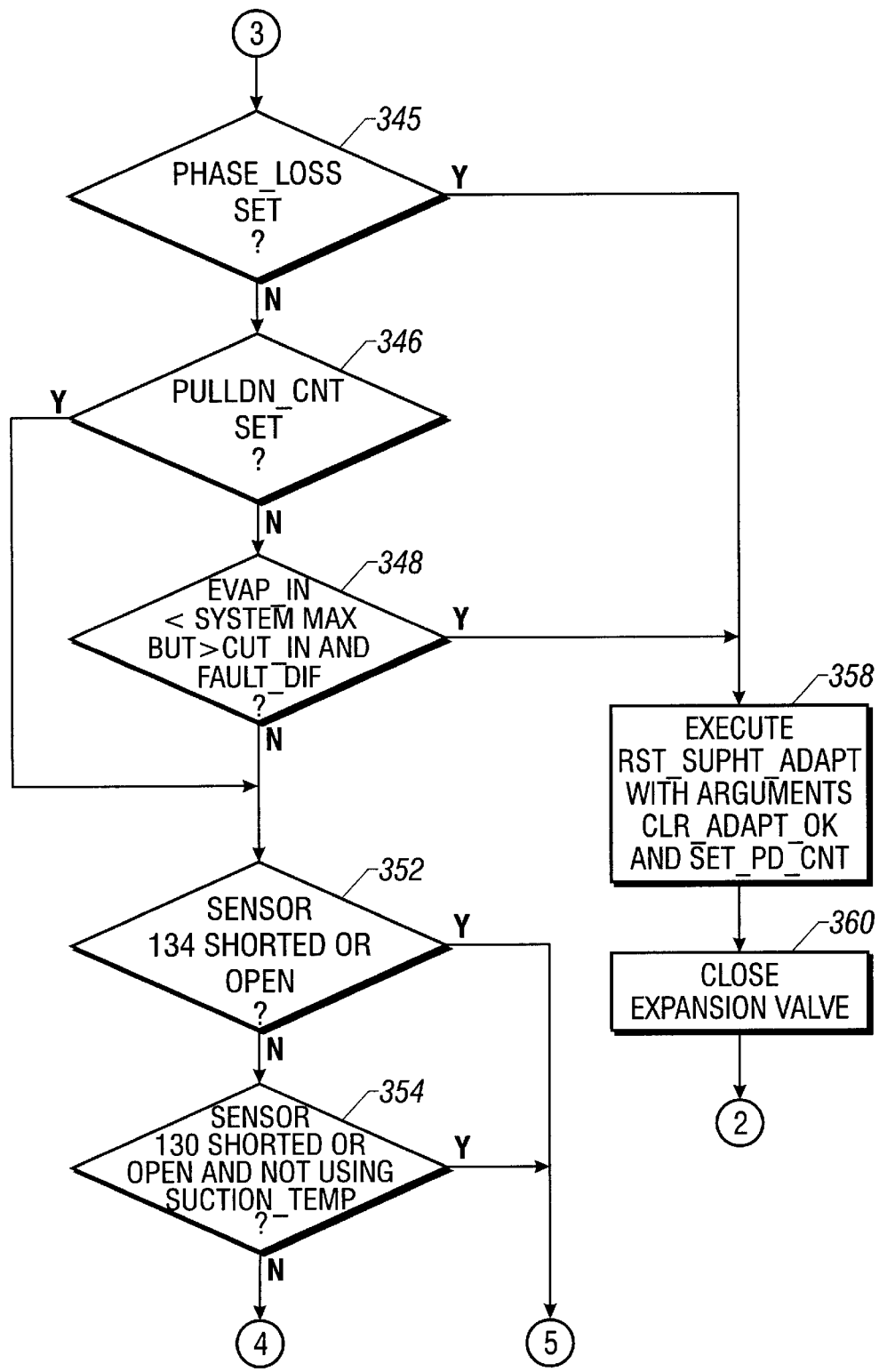
Figure 4C:
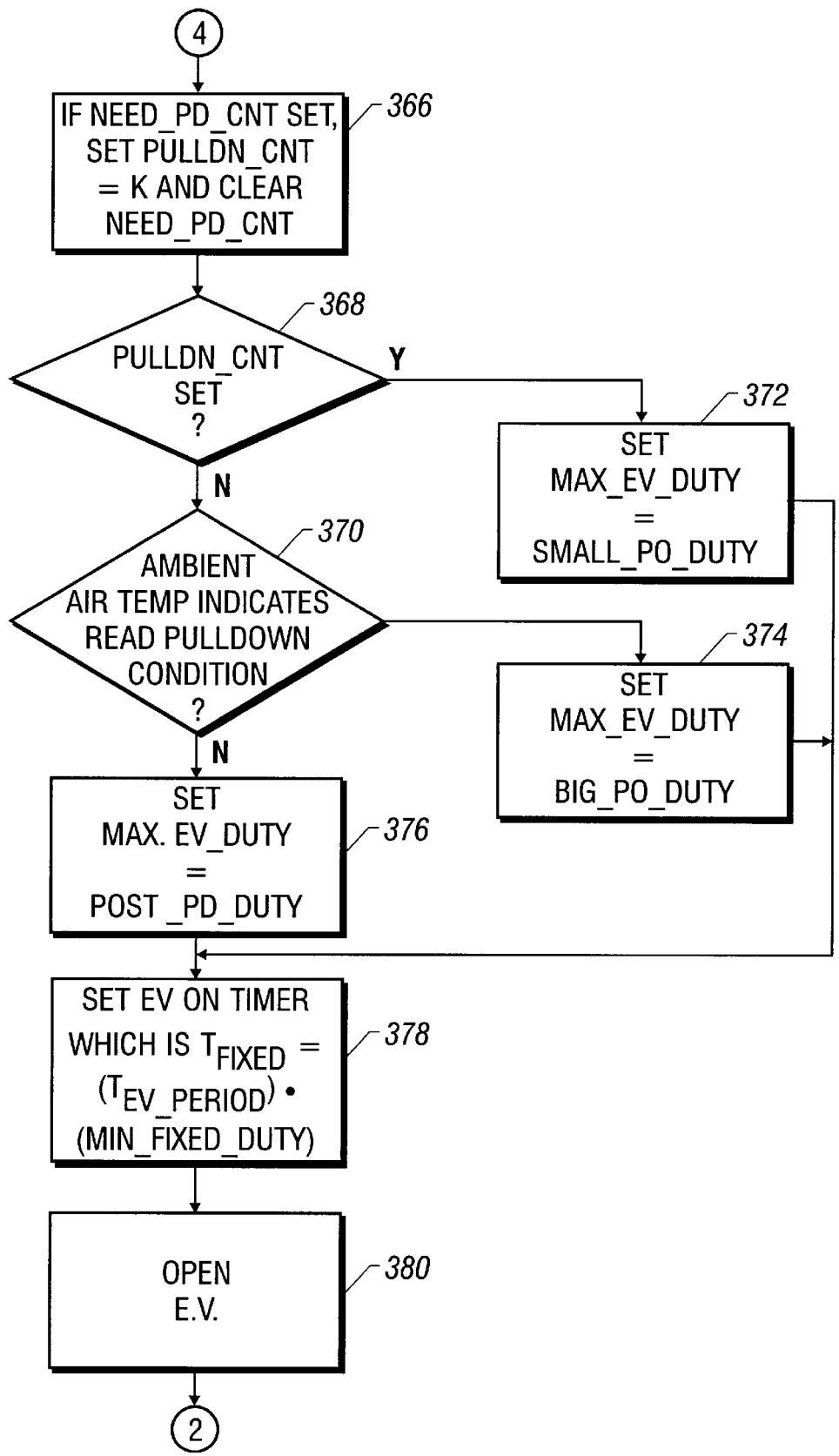
Figure 4D:
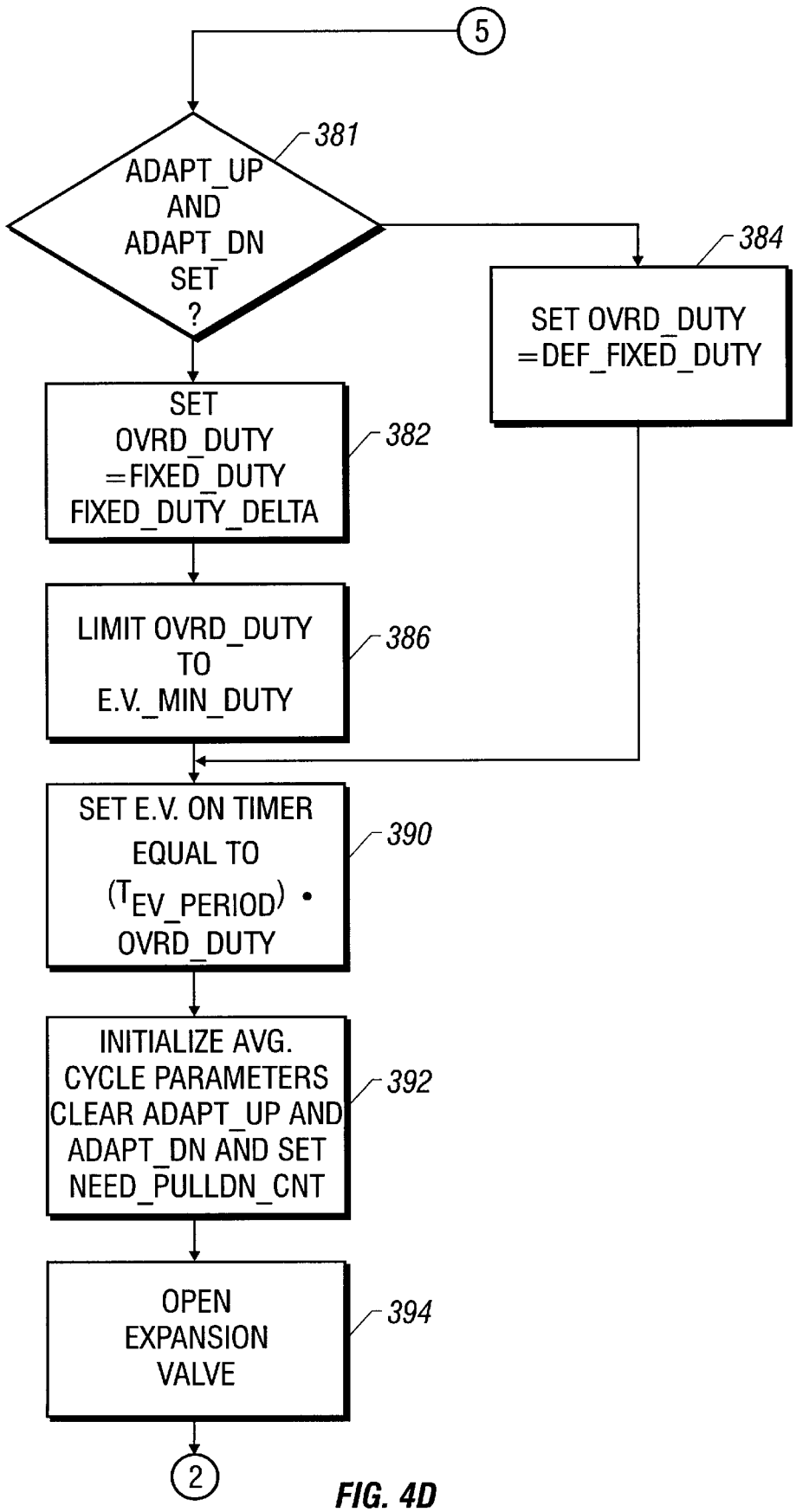

As shown in FIG. 4A, for purposes of controlling the open interval $T_{OPEN}$ of the valve 114, the controller 100 determines 332 whether the previous expansion valve cycle 200 has just completed and another successive expansion valve cycle 200 is about to begin. If so, the controller 100 prepares 333–394 (FIGS. 4A–4D) for another expansion valve cycle 200. In this preparation, the controller 100 decrements a parameter called PULLDN_CNT if a pull down interval (described below) is currently being measured by the controller 100. The controller 100 next determines 338 whether an averaging cycle 203 should be completed by comparing the number of elapsed expansion valve cycles 200 in the current averaging cycle 203 to a default maximum threshold. If the maximum threshold has been exceeded, the controller 100 executes 344 a routine called SUPHT_ADAPT for purposes of determining a new value for the FIXED_DUTY parameter (and thus, a new duration of the interval $T_{FIXED}$). If the maximum threshold has not been exceeded, the controller 100 then determines 340 whether the refrigeration system 10 has been recently off-line, and if so, the controller 100 then determines 342 whether the number of expansion valve cycles 200 has exceeded a default nominal threshold. If so, the controller 100 executes the superheat SUPHT_ADAPT routine.

If the controller 100 determines 345 (FIG. 4B) that the PHASE_LOSS parameter is set (indicating a loss of at least one of the phases of the three phase power received by the refrigeration system 10), the controller 100 executes 358 the RST_SUPHT_ADAPT routine with arguments CLR_ADAPT_OK and SET_PD_CNT and closes 360 the expansion valve 114.

If the controller 100 determines 346–350 that the PULLDN_CNT parameter is equal to zero and the effective inlet temperature of the evaporator coil 104 is above a predetermined suction pressure fault threshold, then the controller 100 executes 358 the RST_SUPHT_ADAPT routine with arguments CLR_ADAPT_OK and SET_PD_CNT and closes 360 the expansion valve 114. Otherwise, the controller 100 determines 352 whether the sensor 134 is shorted or opened (i.e., the controller 100 determines whether the sensor 134 is defective).

If the sensor 134 is neither shorted nor opened, then the controller 100 determines 354 whether sensor 130 is shorted or open and the SUCTION_TEMP parameter is invalid. If so, the controller 100 sets 366 (FIG. 4C) the parameter PULLDN_CNT, if needed (as indicated by a NEED_PD_CNT flag). If the controller 100 determines 368 that the PULLDN_CNT parameter is nonzero, the controller 100 sets a parameter called MAX_EV_DUTY (the maximum allowable duration in percent for $T_{OPEN}$) equal to a predetermined pull down value. If the controller 100 determines 368 that the PULLDN_CNT parameter is equal to zero, then the controller 100 determines 370 whether the measured ambient air temperature indicates an actual pulldown condition for the refrigerated fixture 108 (as shown in FIG. 8). If so, then the controller 100 sets 374 the MAX_EV_DUTY parameter equal to a larger predetermined pull down value. Otherwise, if the refrigerated fixture 108 is not in pull down, the controller 100 sets 376 the MAX_EV_DUTY parameter equal to a predetermined value that is in between the two above-described values.

The controller 100 then sets 378 an expansion valve on timer equal to the product of the duration of the expansion valve period $T_{EV+DI\_PERIOD}$ and a parameter called MIN_FIXED_DUTY. The value of the MIN_FIXED_DUTY parameter is returned from the SUPHT_ADAPT routine and indicates (via a percentage) the duration of the fixed timed interval $T_{FIXED}$. The controller 100 then opens 380 the expansion valve 114 to begin the fixed time interval $T_{FIXED}$. Control then returns to step 300 (FIG. 3A).

If the controller 100 determines 352 (FIG. 4B) that the sensor 134 is shorted or opened, or the controller 100 determines 354 that sensor 130 is shorted or open and the SUCTION_TEMP parameter is invalid, then the controller 100 determines 381 (FIG. 4D) whether the ADAPT_UP and ADAPT_DN flags have been set. If so, the controller 100 calculates a value (in a percentage format) for an override duration parameter called OVRD_DUTY which is used in the calculation of the duration of the interval $T_{FIXED}$. If so, in the calculation of the OVRD_DUTY parameter, the controller 100 sets 382 the OVRD_DUTY parameter equal to the duration of the FIXED_DUTY parameter less a correction parameter called FIXED_DUTY_DELTA. After step 382, if the OVRD_DUTY is less than the EV_MIN_DUTY threshold, the controller 100 sets 386 the OVRD_DUTY parameter equal to the EV_MIN_DUTY threshold. The controller 100 subsequently sets 390 the expansion valve 114 on timer equal to the product of the parameter $T_{EV+DI\_PERIOD}$ and the OVRD_DUTY parameter as the default value for $T_{FIXED}$.

If the controller 100 determines 381 (FIG. 4C) that the ADAPT_UP and ADAPT_DN flags have not been set, then the controller 100 sets 384 the OVRD_DUTY parameter equal to a predetermined constant value and proceeds to step 390.

After step 390 (FIG. 4D), the controller 100 initializes 392 the parameters associated with the averaging cycle 203, clears 392 the flags ADAPT_UP and ADAPT_DN, and sets the flag NEED_PULLDN_CNT. The controller 100 then opens 394 the expansion valve 114 to begin the fixed time interval $T_{FIXED}$ and returns to step 300.

Figure 4E:
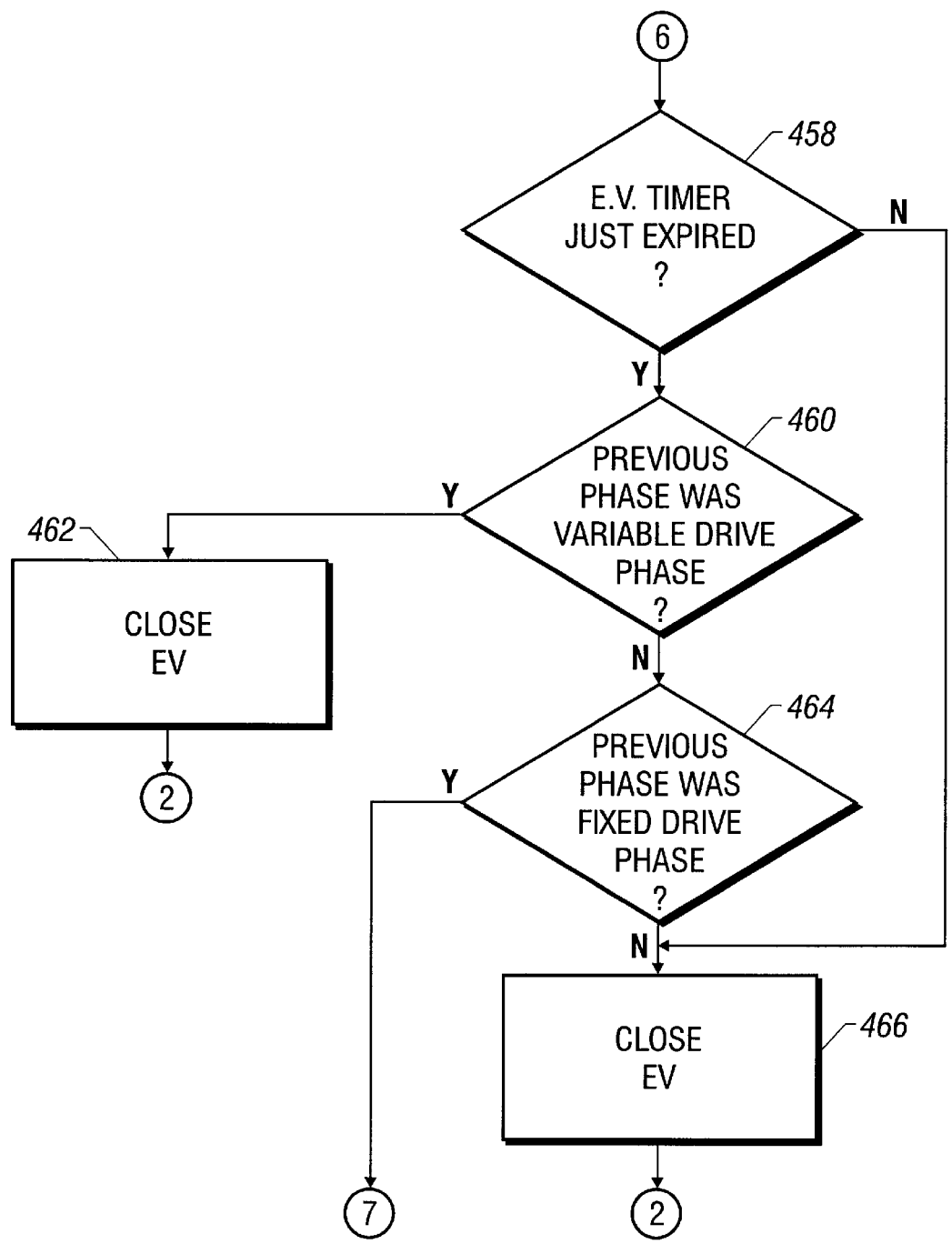
Figure 4F:
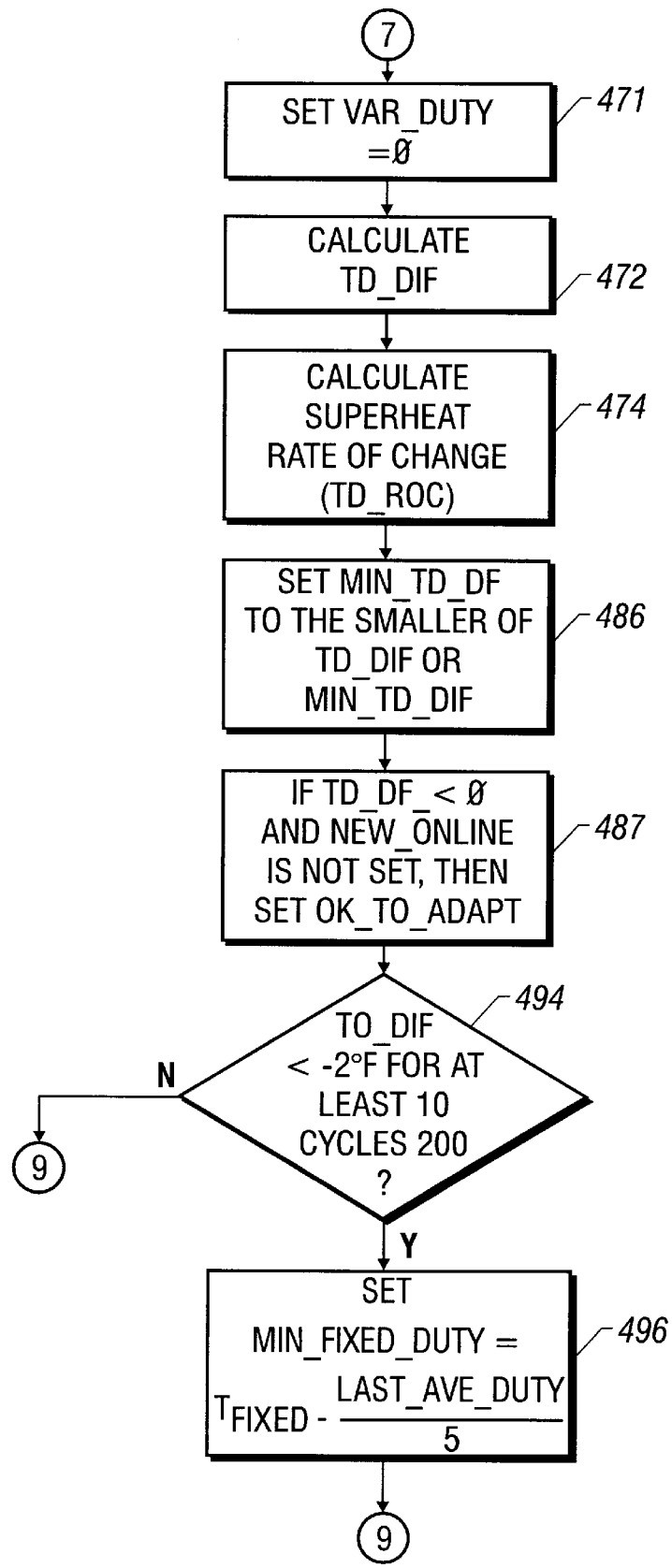
Figure 4G:
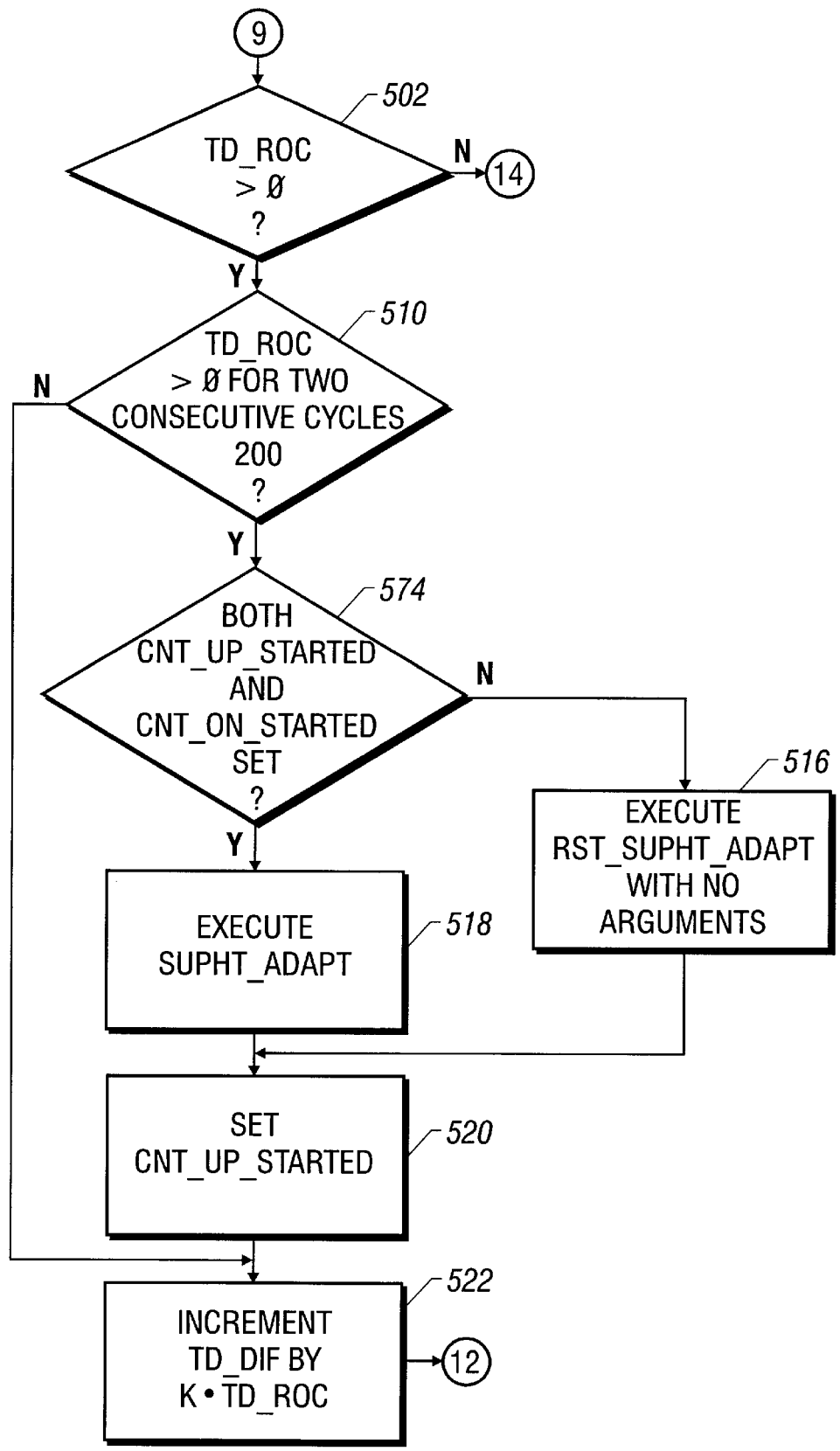
Figure 4H:
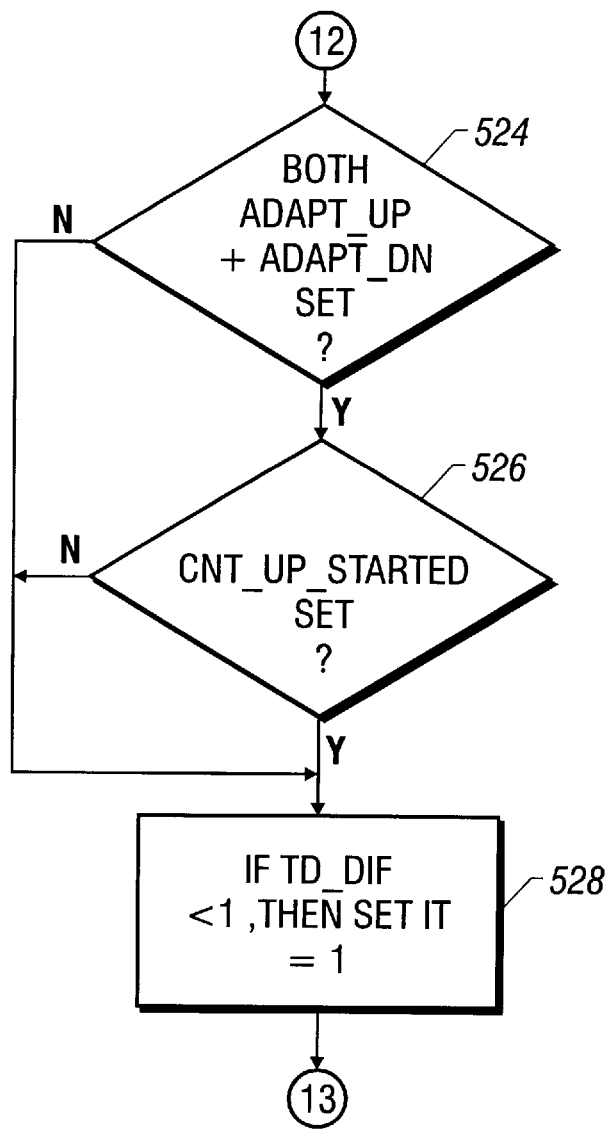
Figure 4I:
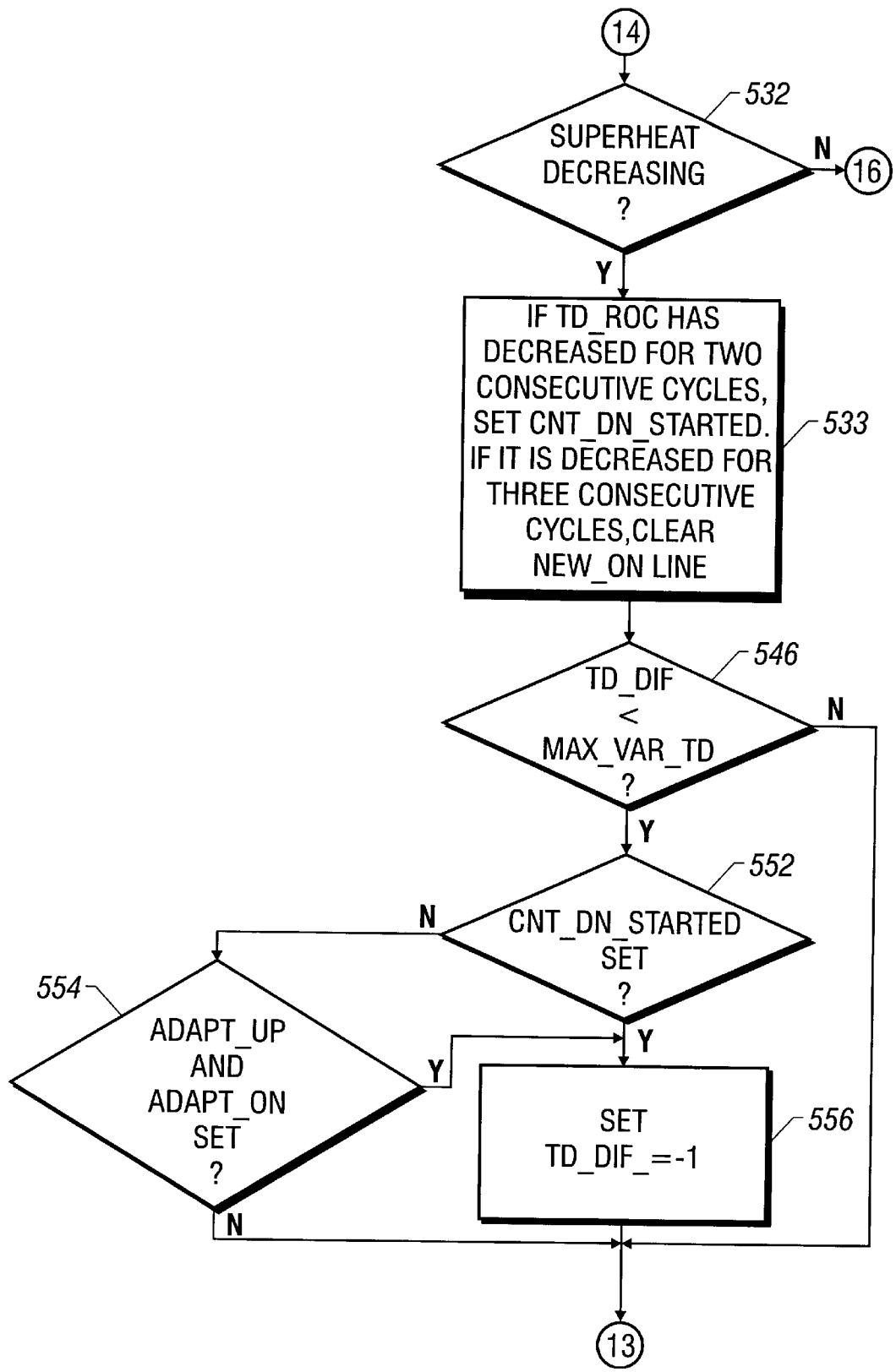
Figure 4J:
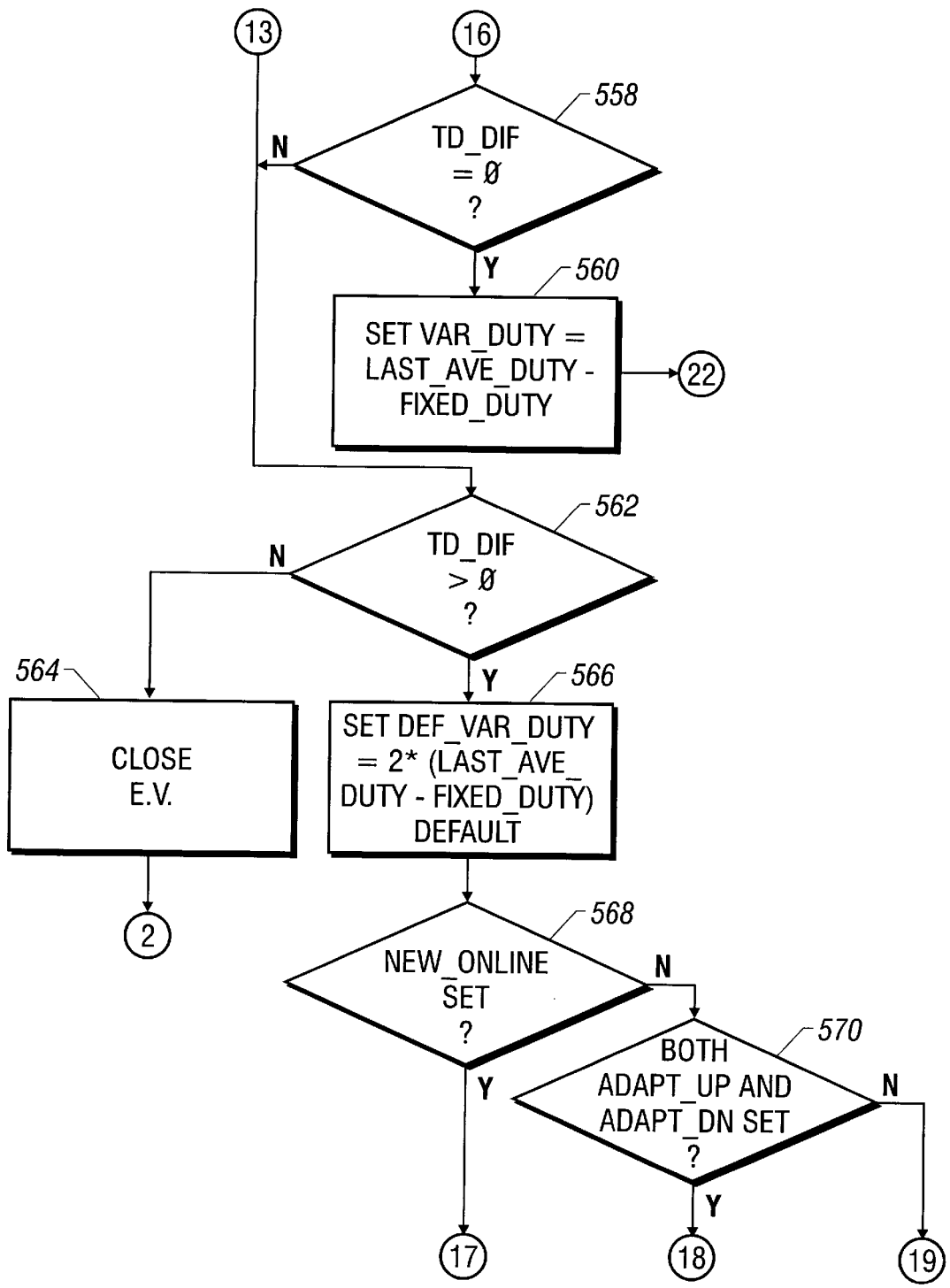
Figure 4K:
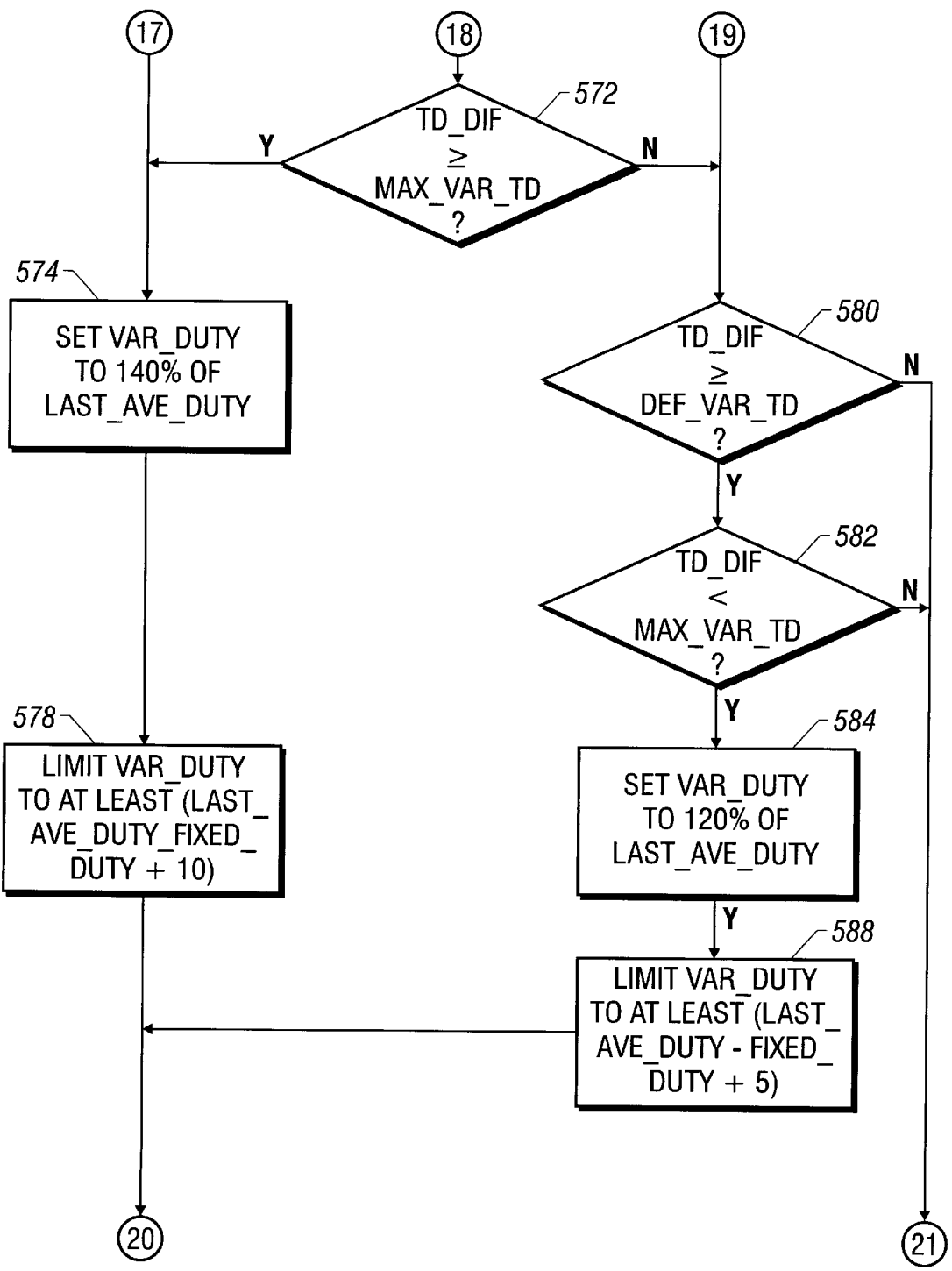
Figure 4L:
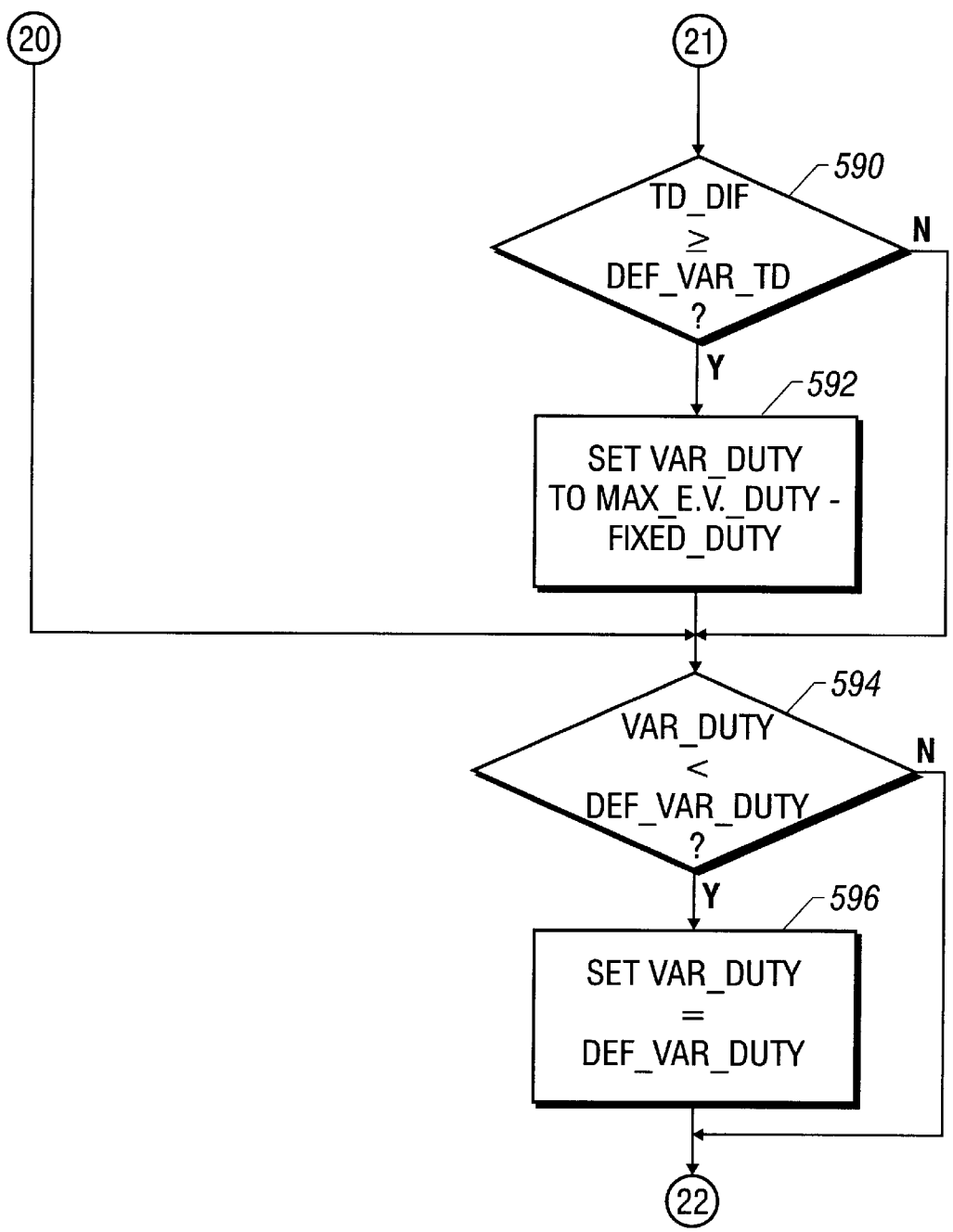
Figure 4M:
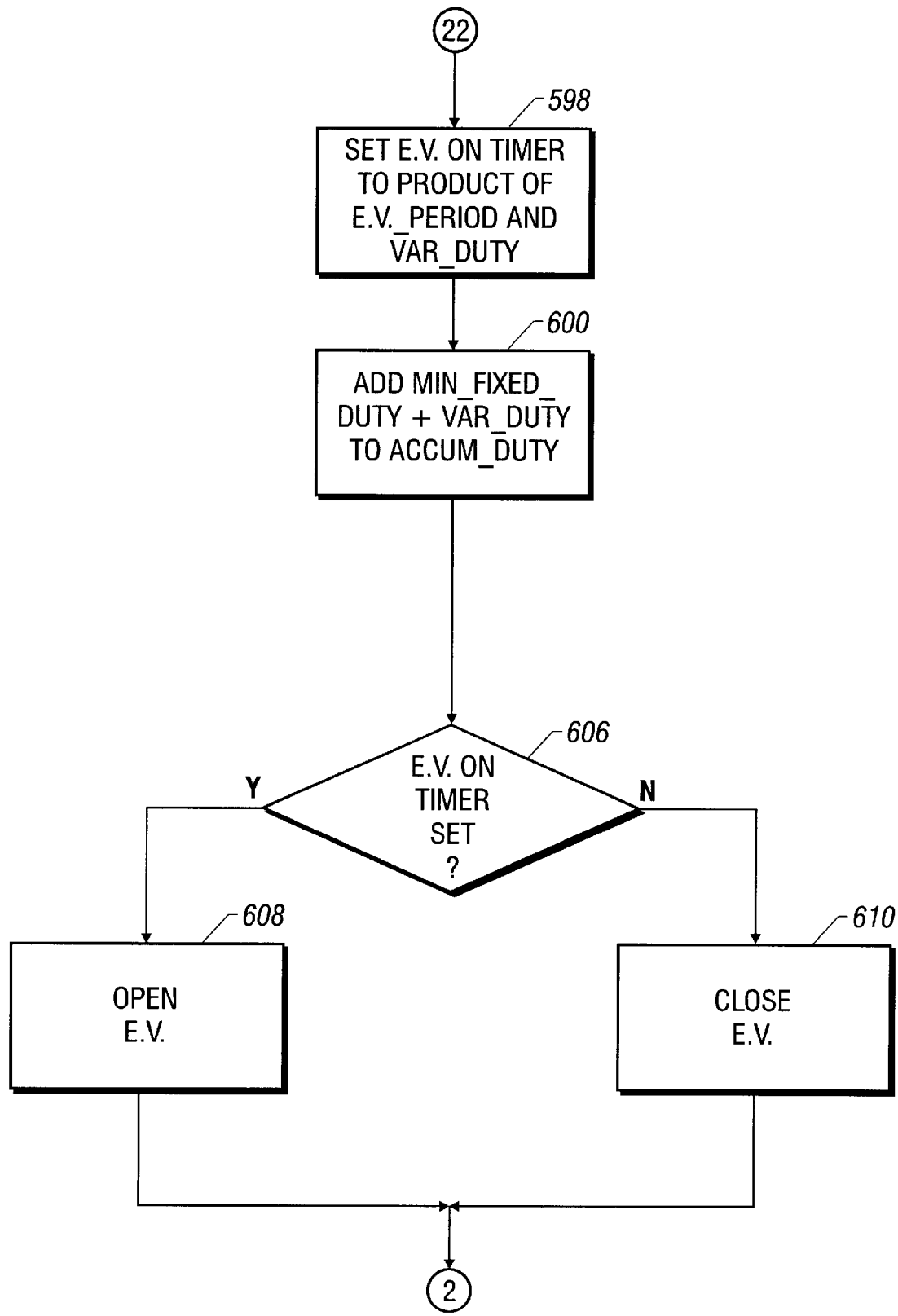

As shown in FIG. 4E, for purposes of beginning the closed time interval $T_{CLOSED}$, the controller 100 determines 460 (via the programmable timer) whether the variable time interval $T_{VAR}$ has just elapsed. If so, the controller 100 closes 462 the expansion valve 114 for the remainder of the expansion valve period $T_{EV+DI\_PERIOD}$ (i.e., for the duration of $T_{CLOSED}$) and returns to step 300 to repeat the above-described process. If the controller 100 determines 464 the interval $T_{FIXED}$ has just elapsed and the previous phase was an override phase the parameter (OVRD_DUTY parameter was set equal to a non-zero value), the controller 100 closes 466 the expansion valve 114 (i.e., no variable time interval $T_{VAR}$) and returns to step 300. Otherwise, the controller 100 regulates the time interval $T_{VAR}$, as described below.

As shown in FIGS. 4F–4M, for purposes of regulating the variable open time interval $T_{VAR}$, the controller 100 clears 471 a parameter called VAR_DUTY (representative of the interval $T_{VAR}$) and calculates 472 the difference between the actual measured superheat and the desired superheat (as indicated by a parameter called TD_DIF). The controller 100 then calculates 474 the rate of change of the superheat (i.e., calculates the rate of change of the TD_DIF parameter) which is indicated by a parameter called TD_ROC. The controller 100 sets 486 a threshold called MIN_TD_DIF (used to indicate the minimum value for TD_DIF) equal to the smaller of TD_DIF or the current value of MIN_TD_DIF. If the TD_DIF parameter is less than zero and the NEW_ONLINE parameter is not set, then the controller 100 sets 487 the OK_TO_ADAPT flag.

The controller 100 next determines 494 whether the measured superheat has been below a predetermined value (e.g., 2° F.) for more than a predetermined number (e.g., 12) of expansion valve cycles 200. If so, the controller 100 sets 496 the MIN_FIXED_DUTY parameter equal to the FIXED_DUTY parameter (from the last expansion valve cycle 200) less a percentage of a parameter called LAST_AVE_DUTY (indicative of rolling average open time (in percent) of the valve 114).

The controller 100 next determines 502 (FIG. 4G) whether the measured superheat is increasing (as indicated by the parameter TD_ROC). If so, the controller 100 determines 510 if the superheat has been increasing for a predetermined number (e.g., 2) of cycles 200. If not, the controller executes 516 the RST_SUPHT_ADAPT parameter with no additional arguments and proceeds to step 520 (described below). If the superheat has been increasing for a predetermined number of cycles, the controller 100 determines 514 whether both a CNT_UP_STARTED flag and a CNT_DN_STARTED flag have been set. The CNT_UP_STARTED parameter is used to indicate that the superheat has been increasing for at least the number of expansion valve cycles 200 indicated in step 510. The CNT_DN_STARTED parameter is used to indicate when the superheat has been decreasing more than a predetermined number (e.g., 2) of cycles 200. If both parameters are set, the controller 100 executes 518 the SUPHT_ADAPT routine. The controller 100 then sets 520 the CNT_UP_STARTED flag (since both the CNT_UP_STARTED and CNT_DN_STARTED flags are reset to zero in the SUPHT_ADAPT routine). If the controller 100 determines 510 that the superheat has not been increasing for the predetermined number, the controller 100 bypasses steps 514–520.

The controller 100 then increments 522 the TD_DIF parameter by an amount proportional to the rate of change of the superheat. The controller 100 then determines 524 (FIG. 4H) whether both the flags ADAPT_UP and ADAPT_DN flags have been set. If so, then the controller 100 determines 526 whether CNT_UP_STARTED flag is set. If so, then the controller 100 limits 528 the TD_DIF parameter to a predetermined minimum threshold (e.g., 1).

If the controller 100 determines 532 that the superheat is decreasing, the controller 100 subsequently determines 540 whether the superheat has been decreasing for more than a predetermined number of expansion valves cycles 200. If so, the controller 100 sets 533 the CNT_DN_STARTED flag (if TD_ROC negative for two cycles 200) and clears the NEW_ONLINE flag (if TD_ROC is negative for three cycles 200). The controller 100 then determines 546 whether the TD_DIF parameter is less than a maximum threshold value. If so, the controller 100 determines 552 whether the CNT_DN_STARTED flag has been set. If so, or if the controller 100 determines 554 both the ADAPT_UP_ and ADAPT_DN flags have been set, the controller 100 sets 556 the TD_DIF parameter equal to a predetermined minimum threshold (e.g., -1).

If the controller 100 determines 532 that the superheat is not decreasing, but rather determines 558 that the superheat is stable and equal to the desired superheat, then the controller 100 sets the parameter VAR_DUTY equal to the LAST_AVE_DUTY parameter less the parameter FIXED_DUTY. The parameter LAST_AVE_DUTY is equal to the average open time (in percent) of the last averaging cycle 203. If the controller 100 determines 558 that the superheat is not at the desired value, then the controller 100 determines 562 whether the actual superheat is greater than the desired superheat. If not, the controller 100 closes 564 the expansion valve 114 (i.e., no variable time interval $T_{VAR}$ is needed) and returns to step 300. Otherwise, the controller 100 calculates 566 a temporary default value for VAR_DUTY (represented by a parameter called DEF_VAR_DUTY). The controller 100 sets 566 the DEF_VAR_DUTY parameter equal to a multiple (e.g., 2) of the LAST_AVE_DUTY parameter less the FIXED_DUTY parameter.

The controller 100 then determines 568 whether the NEW_ONLINE flag is set. If so, or if both the ADAPT_UP and ADAPT_DN flags are set and the TD_DIF parameter is greater or equal to a predetermined threshold, the controller 100 sets 574 the VAR_DUTY parameter (used to calculate the interval $T_{VAR}$) equal to a fixed percentage (e.g., 140%) of the parameter LAST_AVE_DUTY. The controller 100 then limits 576 the VAR_DUTY parameter to a value equal to the LAST_AVE_DUTY parameter less the duration of the FIXED_DUTY parameter plus an additional constant (e.g., 10).

If the controller 100 determines 568 that the NEW_ONLINE flag is set and both the ADAPT_UP and ADAPT_DN flags are not set, or the controller 100 determines 572 that the parameter TD_DIF is less than the maximum threshold, then the controller 100 determines 580 whether the parameter TD_DIF is greater than or equal to a default parameter called DEF_VAR_TD. If so, the controller 100 then determines 582 whether the parameter TD_DIF 582 is less than the maximum threshold MAX_VAR_TD. If so, the controller 100 sets 584 the parameter VAR_DUTY equal to a fixed percentage (e.g., 120%) of the parameter LAST_AVE_DUTY. The controller 100 then limits 588 the minimum value of the parameter VAR_DUTY to the parameter LAST_AVE_DUTY less the parameter FIXED_DUTY plus a constant (e.g., 5). Otherwise, the controller 100 determines 590 whether the parameter TD_DIF is greater than or equal to the maximum threshold MAX_VAR_TD. If so, then the controller 100 sets 592 the parameter VAR_DUTY equal to the parameter MAX_EV_DUTY less the duration of the FIXED_DUTY parameter.

The controller 100 than selects 594–596 the greater value of the parameters VAR_DUTY and DEF_VAR_DUTY and sets VAR_DUTY to this value. The controller 100 then sets 598 the variable time interval $T_{VAR}$ equal to the product of the expansion valve period $T_{EV+DI\_PERIOD}$ and the VAR_DUTY parameter. The controller 100 then adds the parameters MIN_FIXED_DUTY and VAR_DUTY to a parameter called ACCUM_DUTY (used to the indicate (via a percentage) an accumulated open time of the expansion valve 114 over the averaging cycle 203). The controller 100 then determines 606 whether the expansion valve on timer has been set. If so, then the controller 100 opens 608 the expansion valve 114. If not, the controller 100 closes 610 the expansion valve 114. The controller 100 then returns to step 300.

Figure 5A:
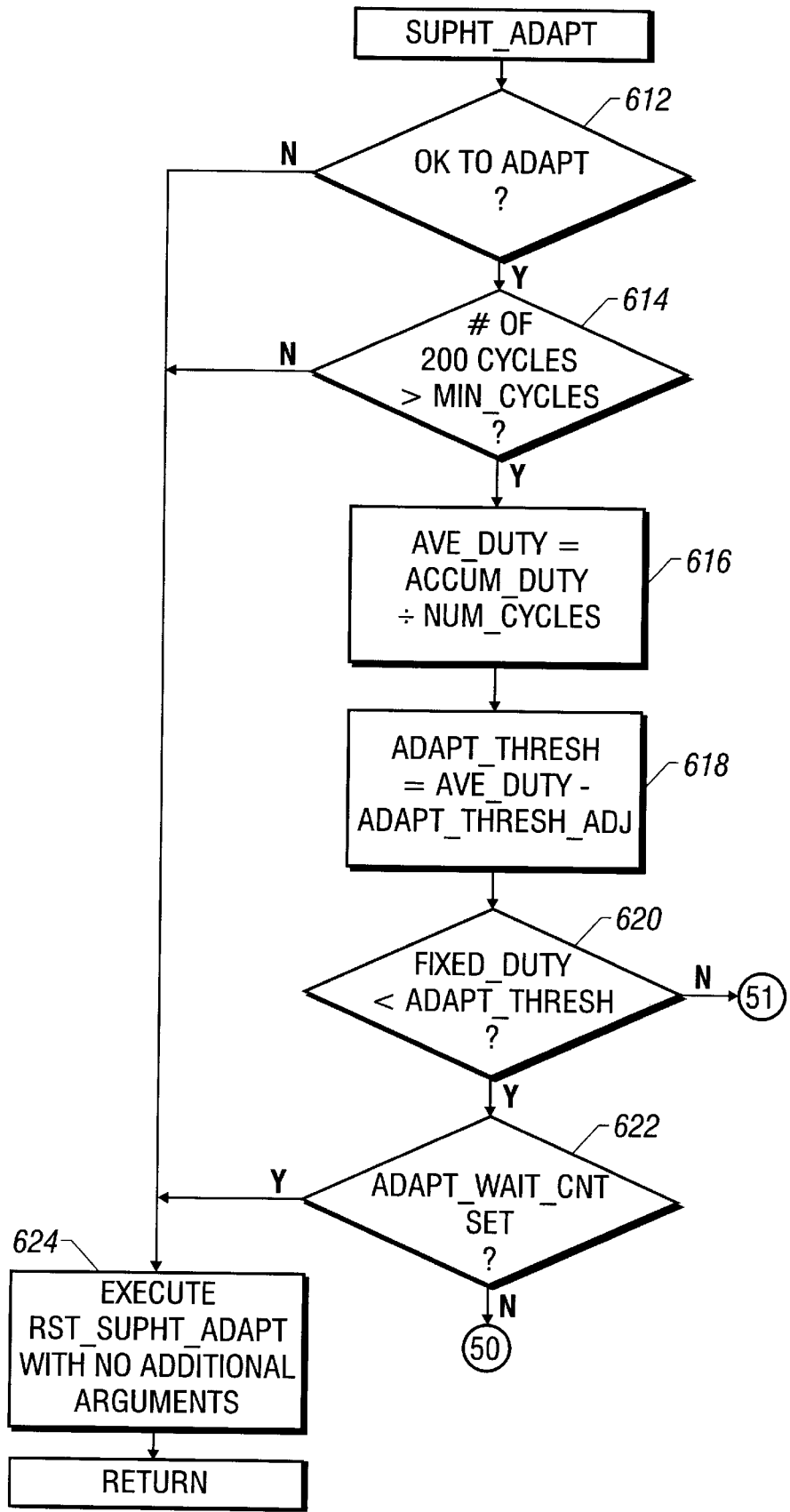
Figure 5B:
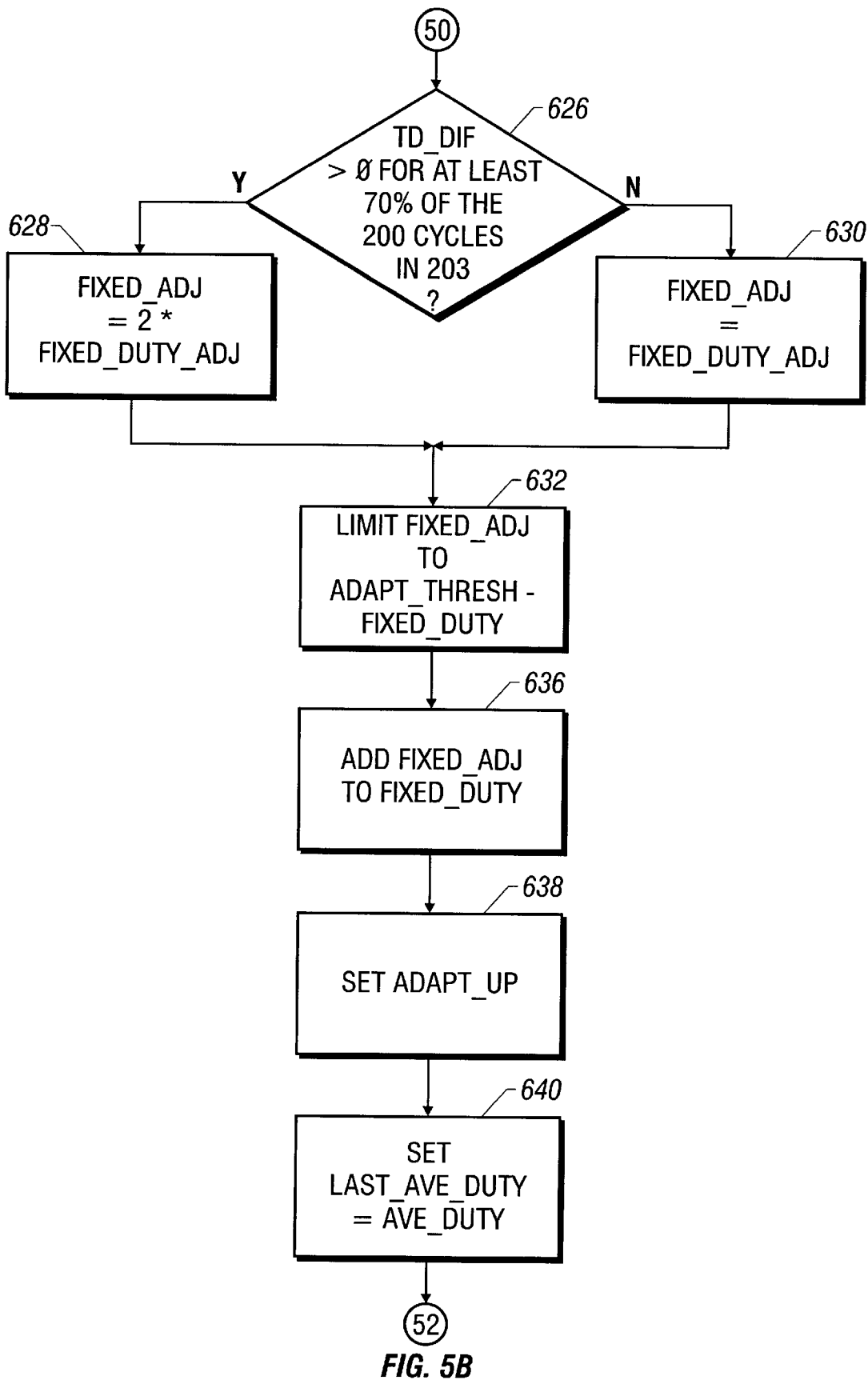
Figure 5C:
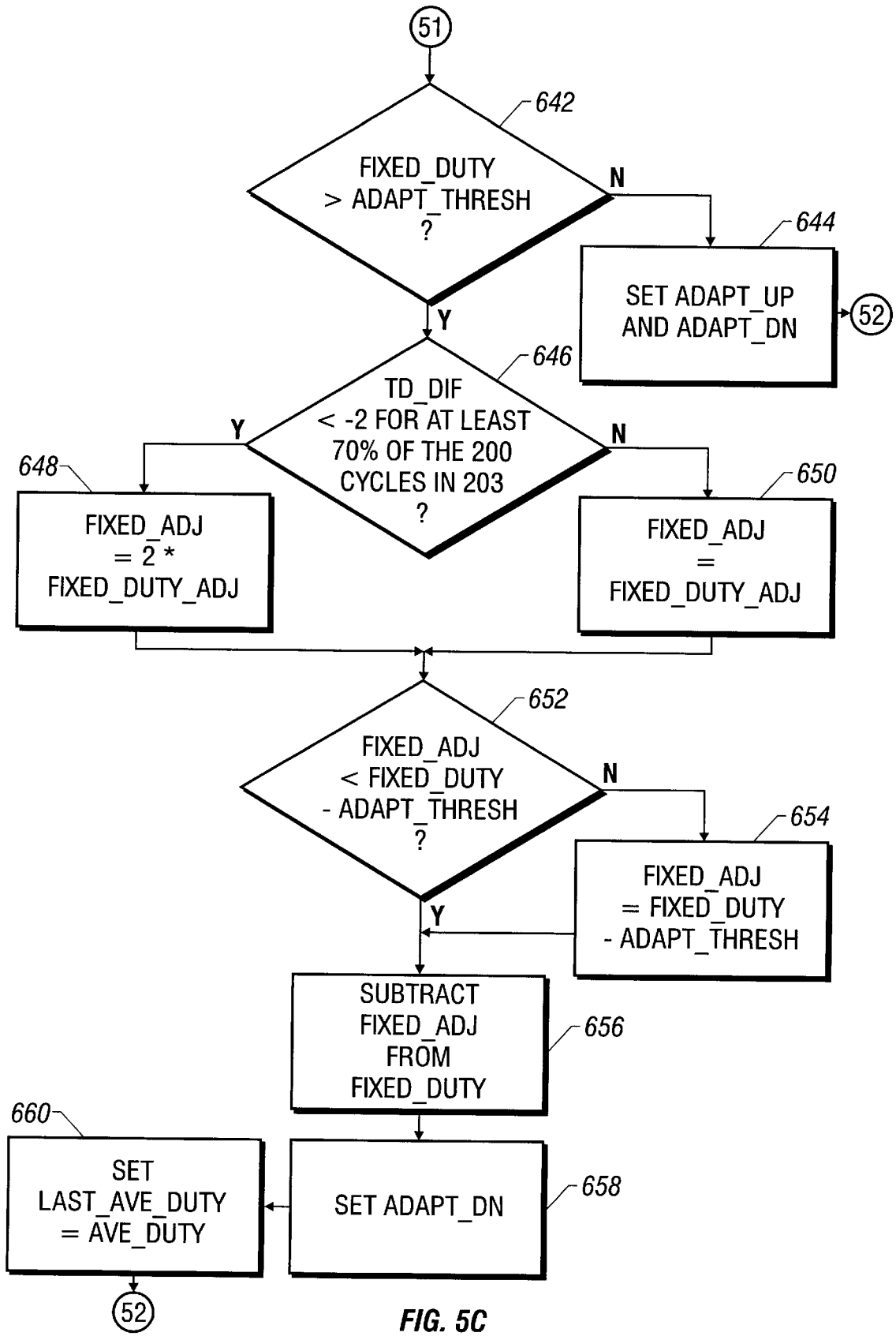
Figure 5D:
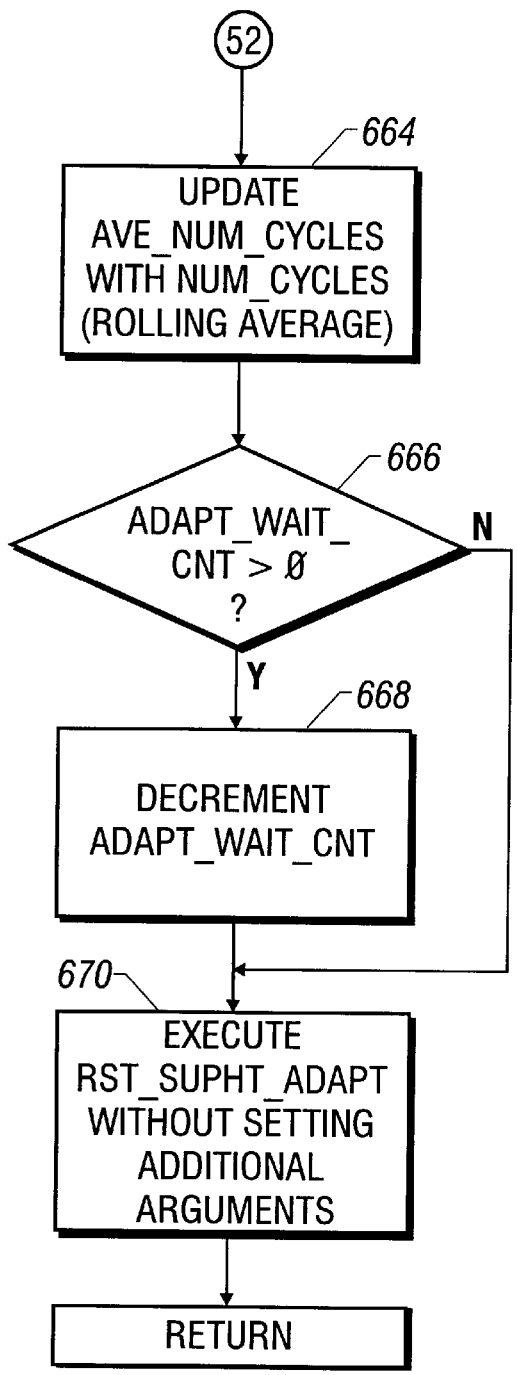

As shown in FIGS. 5A–C, for the purpose of determining the parameter FIXED_DUTY, the controller 100 executes the SUPHT_ADAPT routine. In the SUPHT_ADAPT routine, the controller 100 first determines 612 whether the flag OK_TO_ADAPT has been set. If not, then the controller 100 executes 624 RST_SUPHT_ADAPT with no additional arguments and returns from SUPHT_ADAPT routine. Otherwise, the controller 100 determines 614 whether a minimum threshold of expansion valve cycles 200 have occurred in the averaging cycle 203. If not, the controller 100 goes to step 624. Otherwise, the controller 100 calculates 616 the average open time in percent of the valve 114 during the last averaging cycle 203. The controller 100 then calculates 618 a parameter called ADAPT_THRESH which is equal to the average open time in percent of the last averaging cycle 203 (indicated by a parameter called AVE_DUTY) less an adaptation threshold adjustment. If the controller 100 determines 620 that the previous fixed phase parameter FIXED_DUTY is less than the ADAPT_THRESH parameter, then the controller 100 determines 622 whether the ADAPT_WAIT_CNT parameter has been set. If so, it goes to step 624. Otherwise, the controller 100 determines 626 whether the superheat was greater than the desired superheat for a fixed percentage (e.g., 70%) of the previous averaging cycle 203. If so, then the controller 100 sets a gain adjustment parameter called FIXED_ADJ equal to a multiple of a parameter adjustment constant called FIXED_DUTY_ADJ. If not, than the controller 100 sets the gain adjustment parameter FIXED_ADJ equal to the parameter FIXED_DUTY ADJ.

The controller 100 then limits 632 the maximum value of the parameter FIXED_ADJ equal to the adaptation threshold parameter ADAPT_THRESH less the parameter FIXED_DUTY. The controller 100 than adds 636 the parameter FIXED_ADJ to the FIXED_DUTY PARAMETER. The controller 100 then sets the parameter ADAPT_UP and sets 640 the parameter LAST_AVE_DUTY equal to AVE_DUTY.

If the controller 100 determines 640 that FIXED_DUTY is not less than the ADAPT_THRESH parameter, than the controller 100 determines 642 whether the parameter FIXED_DUTY is greater than the parameter ADAPT_THRESH. If not, than the controller 100 sets 644 the flags ADAPT_UP and ADAPT_DN and proceeds to step 664. Otherwise, the controller 100 determines 646 whether the superheat has been less than the desired superheat for at least a fixed percentage (e.g., 70%) of the averaging cycle 203. If so, then the controller 100 sets 648 the gain adjust parameter FIXED_ADJ equal to a multiple (e.g., 2) of the parameter FIXED_DUTY_ADJ. Otherwise, the controller 100 sets 650 the parameter FIXED_ADJ equal to the parameter FIXED_DUTY_ADJ.

The controller 100 then limits 652 the parameter FIXED_ADJ equal to the FIXED_DUTY parameter less the parameter ADAPT_THRESH. The controller 100 than subtracts 656 the parameter FIXED_ADJ from the FIXED_DUTY parameter. The controller 100 then sets 658 the ADAPT_DN flag and sets 660 the parameter LAST_AVE_DUTY equal to the parameter AVE_DUTY. The controller 100 then proceeds to step 664.

The controller 100 updates 664 the parameter AVE_NUM_CYCLES with the value represented by the parameter NUM_CYCLES using a rolling average. If the controller 100 determines 666 the ADAPT_WAIT_CNT parameter is set, the controller 100 decrements 668 the ADAPT_WAIT_CNT parameter. The controller 100 then executes 670 the RST_SUPHT_ADAPT routine with no additional arguments before returning from the RST_SUPHT_ADAPT routine.

Figure 5E:
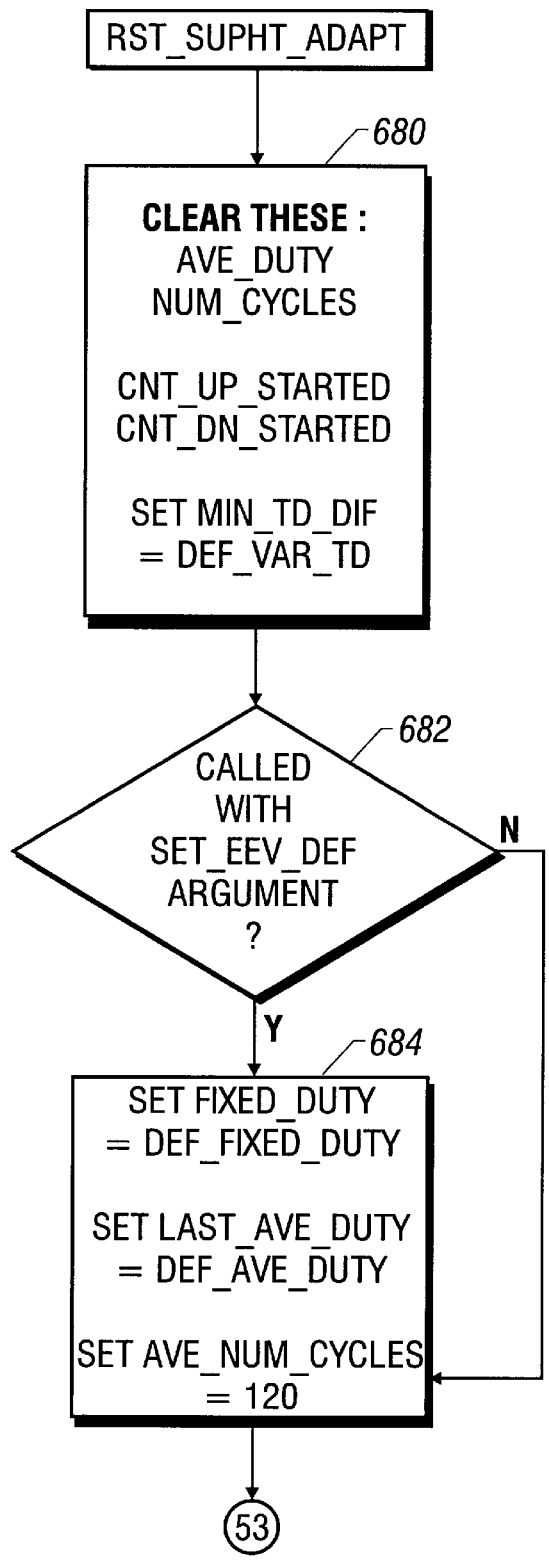
Figure 5F:
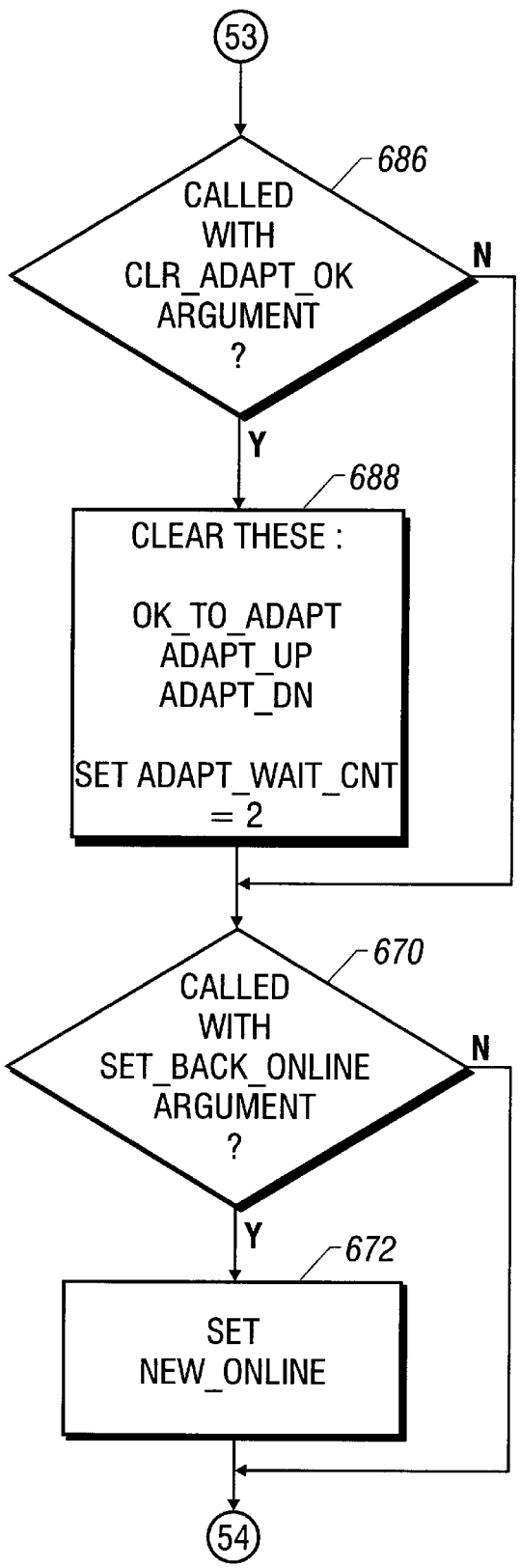
Figure 5G:
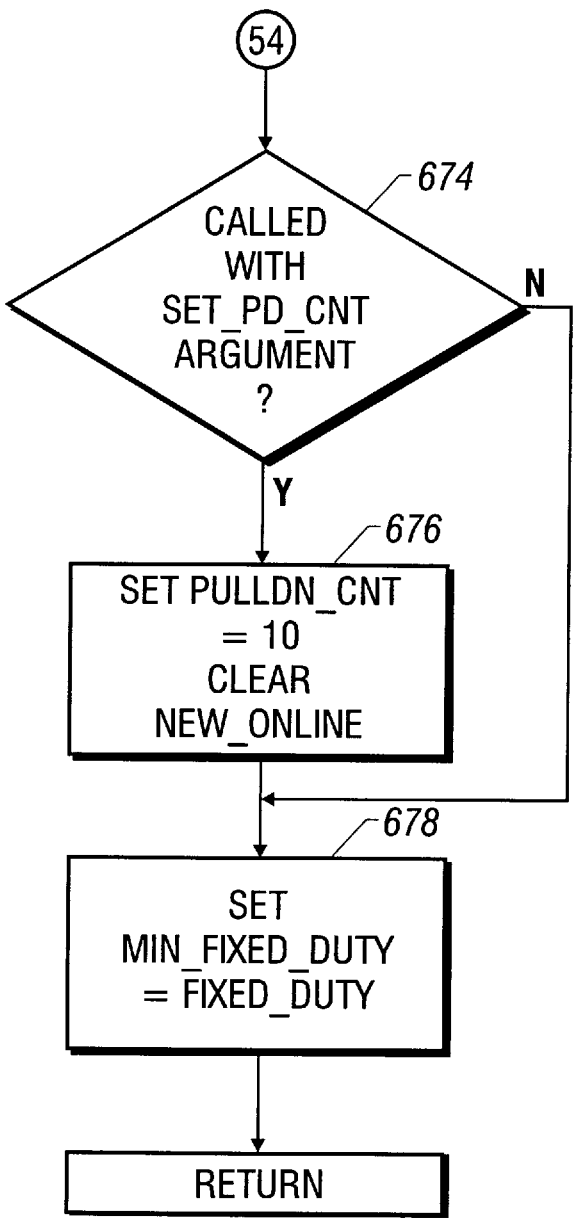

As shown in FIGS. 5E–5G, for the purposes of resetting and initializing certain parameters associated with superheat adaptation, the controller 100 executes the RST_SUPHT_ADAPT routine. In this routine, several parameters are assigned 680 default values. The parameters AVE_DUTY, parameter NUM_CYCLES, flag CNT_UP_STARTED and flag CNT_DN_STARTED are cleared; and the parameter MIN_TD_DIF is set equal to a default value called DEF_VAR_TD. If the controller 100 determines 682 that the RST_SUPHT_ADAPT routine has been called with the SET_EEV_DEF argument set, several parameters (FIXED_DUTY, LAST_AVE_DUTY and AVE_NUM_CYCLES) are set 684 equal to default values. If the controller 100 determines 686 that the RST_SUPHT_ADAPT routine has been called with the CLR_ADAPT_OK flag set, additional flags (OK_TO_ADAPT, ADAPT_UP, ADAPT_DN and ADAPT_WAIT_CNT) are modified 688. If the controller determines 670 that the RST_SUPHT_ADAPT routine has been called with the SET_BACK_ONLINE flag set, the NEW_ONLINE flag is also set 672. If the controller 100 determines 674 that the RST_SUPHT_ADAPT routine has been called with the SET_PD_CNT flag set, additional flags (PULLDN_CNT and NEW_ONLINE) are modified 676. Finally, the controller 100 sets 678 the parameter MIN_FIX_DUTY equal to the FIXED_DUTY parameter before returning from the RST_SUPHT_ADAPT routine.

Figure 9:
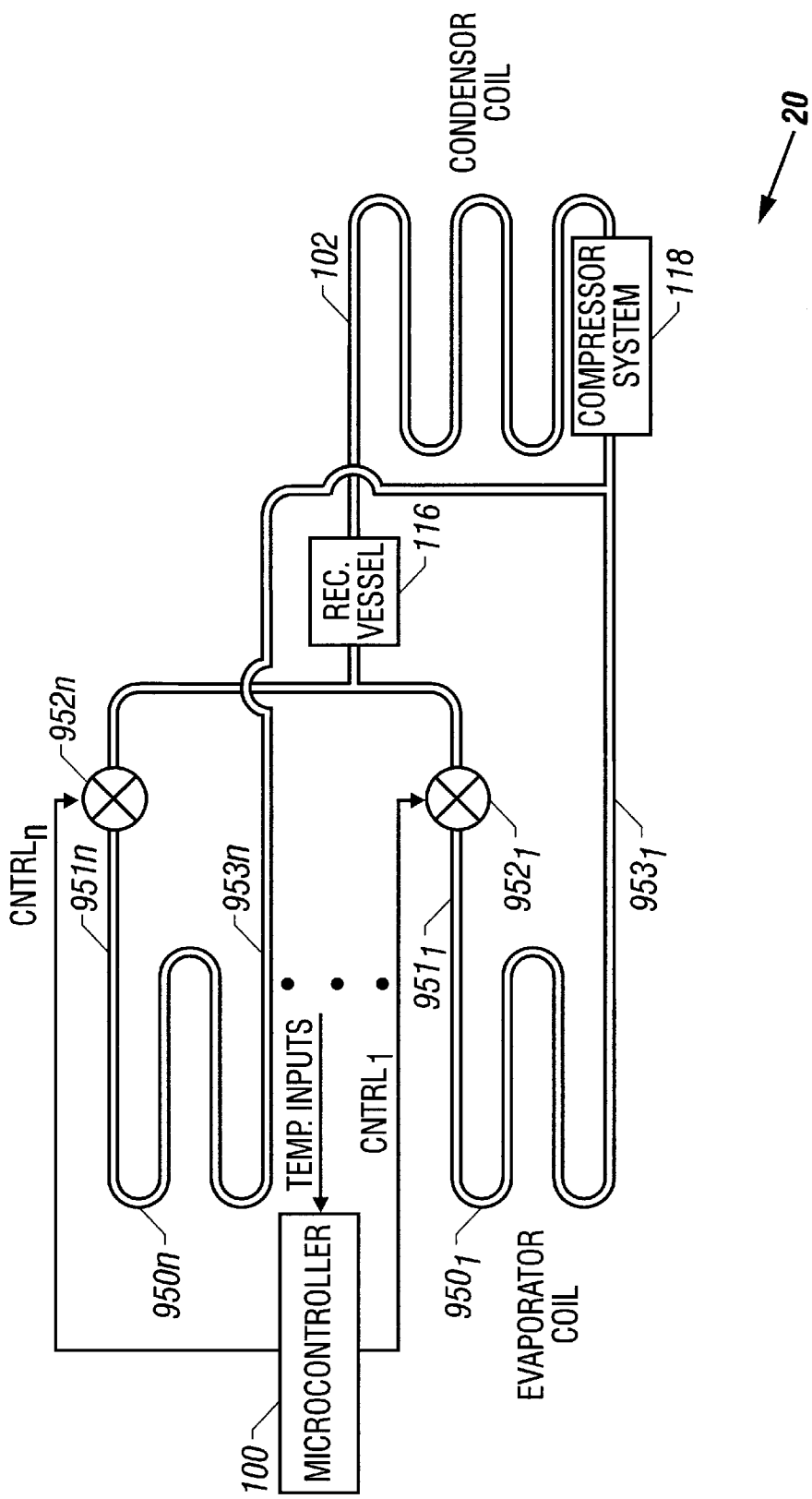
FIG. 9 is a block diagram of a refrigeration system according to one embodiment of the invention.

Other embodiments are within the scope of the following claims. For example, instead of one evaporator coil 104, in another refrigeration system 20, multiple evaporator coils 950 (n total) are connected in parallel (FIG. 9). An expansion valve 952 for each coil 950 controls the rate at which refrigerant enters the inlet from the receiver vessel 116. An outlet 953 of each evaporator coil 950 returns the refrigerant to the compressor system 118.

As described above, the controller 100 determines the average rate at which the refrigerant must flow to provide the desired superheat and regulates the open time interval $T_{OPEN}$ based on this rate. However, as shown in FIG. 10, in the multiple evaporator coil embodiment, valve control signals $CNTRL_{1-n}$ for the valves $952_{1-n}$ (FIG. 9) are equally staggered apart in time to smooth the flow of the refrigerant in the system 20.

What is claimed is:

1. A method for use in a refrigeration system capable of furnishing a refrigerant and having an evaporator coil, the method comprising:
   (a) calculating an average rate of a flow of refrigerant into the evaporator coil at which a desired temperature difference is produced across the coil; and
   (b) furnishing the refrigerant to the evaporator coil based on the calculated average rate.

2. The method of claim 1, wherein the furnishing step includes using an expansion valve for controlling flow of the refrigerant into the coil.

3. The method of claim 2, wherein the furnishing step includes successively opening and closing the valve.

4. The method of claim 1, wherein the temperature difference is measured between an outlet and an inlet of the evaporator coil.

5. The method of claim 1, wherein the determining step includes calculating the average rate based on a natural fill and boil cycle of the evaporator coil.

6. The method of claim 1, wherein the determining step includes:
   (a) furnishing refrigerant to the evaporator coil over a time interval;
   (b) regulating the flow of the refrigerant into the evaporator coil over the time interval to maintain the desired temperature difference across the coil;
   (c) monitoring the flow of the refrigerant through the evaporator coil over the time interval; and
   (d) calculating the average rate based on the flow rate monitored during the time interval.

7. The method of claim 6, wherein the time interval is of the same duration as a natural fill and boil cycle of the evaporator coil.

8. The method of claim 7, further comprising measuring the natural fill and boil cycle during pull down of the refrigeration system.

9. A refrigeration system comprising:
   (a) an evaporator coil capable of circulating a refrigerant; and
   (b) a controller configured to:
      (1) calculate an average rate of a flow of refrigerant into the evaporator coil at which a desired temperature difference is produced across the coil; and
      (2) furnish the refrigerant to the evaporator coil based on the calculated average rate.

10. The refrigeration system of claim 9, wherein the controller includes a microcontroller.

11. The refrigeration system of claim 9, wherein the controller includes a valve for controlling the flow of refrigerant into the evaporator coil.

12. The refrigeration system of claim 11, wherein the valve is successively opened and closed.

13. The refrigeration system of claim 9, wherein the temperature difference is measured between an outlet and an inlet of the evaporator coil.

14. The refrigeration system of claim 9, wherein the controller calculates the average rate based on a natural fill and boil cycle of the evaporator coil.

15. The refrigeration system of claim 9, wherein the controller calculates the average rate by furnishing refrigerant to the evaporator coil over a time interval, regulating the flow of the refrigerant through the evaporator coil over the time interval to maintain the desired temperature difference across the coil, monitoring the flow of the refrigerant through the evaporator coil over the time interval, and calculating the average rate based on the flow rate monitored during the time interval.

16. The refrigeration system of claim 15, wherein the time interval is of the same duration as a natural fill and boil cycle of the evaporator coil.

17. The refrigeration system of claim 16, wherein the controller is further configured to measure the natural fill and boil cycle during pull down of the refrigeration system.

18. A refrigeration system comprising:
   (a) an evaporator coil capable of circulating a refrigerant through the coil;
   (b) a valve for controlling a flow of the refrigerant into the coil, the valve having a control input for opening and closing the valve;
   (c) a temperature sensor for indicating a temperature difference across the coil;
   (d) a controller coupled to the sensors and the control input of the valve, the controller configured to:
      (1) calculate an average rate of a flow of the refrigerant into the evaporator coil at which a desired temperature difference is produced across the coil by:
         a) selectively turning on and off the valve over a time interval to maintain the desired temperature difference, and
         b) calculating the average rate of refrigerant flow during the time interval; and
      (2) selectively turn on the valve to furnish the refrigerant to the evaporator coil based on the calculated average rate.

19. A refrigeration system comprising:
   (a) an evaporator coil capable of circulating a refrigerant through the coil;
   (b) means for calculating an average rate of a flow of refrigerant into the evaporator coil at which a desired temperature difference is produced across the coil; and
   (c) means for furnishing the refrigerant to the evaporator coil based on the calculated average rate.

* * * * *